(12) United States Patent
Hamano et al.

(10) Patent No.: US 7,798,904 B2
(45) Date of Patent: Sep. 21, 2010

(54) BILLIARD GAME INPUT DEVICE, BILLIARD GAME SYSTEM, GAME INPUT DEVICE, AND COMPUTER PROGRAM

(75) Inventors: Takashi Hamano, Tokyo (JP); Koki Atobe, Tokyo (JP); Hiroshi Kinomoto, Tokyo (JP); Hideki Hashimoto, Tokyo (JP); Ryo Mahara, Tokyo (JP)

(73) Assignee: Konami Corporation, Tokyo (JP)

( * ) Notice: Subject to any disclaimer, the term of this patent is extended or adjusted under 35 U.S.C. 154(b) by 677 days.

(21) Appl. No.: 11/312,819

(22) Filed: Dec. 19, 2005

(65) Prior Publication Data

US 2006/0100016 A1 May 11, 2006

Related U.S. Application Data

(62) Division of application No. 10/301,316, filed on Nov. 21, 2002, now Pat. No. 7,458,893.

(30) Foreign Application Priority Data

Nov. 22, 2001 (JP) ............................. 2002-357331
Nov. 22, 2001 (JP) ............................. 2002-357339

(51) Int. Cl.
*A63F 9/24* (2006.01)
*A63F 13/00* (2006.01)
(52) U.S. Cl. .................................. 463/36; 463/2; 463/7
(58) Field of Classification Search ................ 463/1–5, 463/7, 36; 473/1, 4–5, 22, 44–46, 52–53, 473/138–141, 143, 145–146, 151–153; 273/108–109, 273/309, 317
See application file for complete search history.

(56) References Cited

U.S. PATENT DOCUMENTS

| 4,429,880 | A | * | 2/1984 | Chen et al. .................. 473/141 |
| 5,171,012 | A | * | 12/1992 | Dooley .......................... 463/2 |
| 5,734,370 | A | | 3/1998 | Skodlar et al. |
| 6,042,483 | A | * | 3/2000 | Katayama ................... 473/199 |
| 6,146,283 | A | * | 11/2000 | Ferguson, III ............... 473/145 |
| 2002/0155896 | A1 | * | 10/2002 | Gobush et al. .............. 473/197 |

FOREIGN PATENT DOCUMENTS

| EP | 1 080 748 | 3/2001 |
| FR | 2 804 879 | 8/2001 |
| JP | 2001-009154 | 1/2001 |
| JP | 2001-178966 | 7/2001 |

* cited by examiner

*Primary Examiner*—Peter DungBa Vo
*Assistant Examiner*—Jasson H Yoo
(74) *Attorney, Agent, or Firm*—Jordan and Hamburg LLP

(57) ABSTRACT

Provided is an input device for a billiard game comprising: a simulative ball provided as an object to be shot by a player; a link portion having a ball axis on which the simulative ball is mounted; a support portion for movably supporting the link portion; and a sensor for outputting a signal that corresponds to an operation of the link portion,
wherein at least either one of rotational motion of the simulative ball around an axle of a ball axis and linear motion of the simulative ball in a predetermined range along an axial direction of the ball axis is permitted.

19 Claims, 16 Drawing Sheets

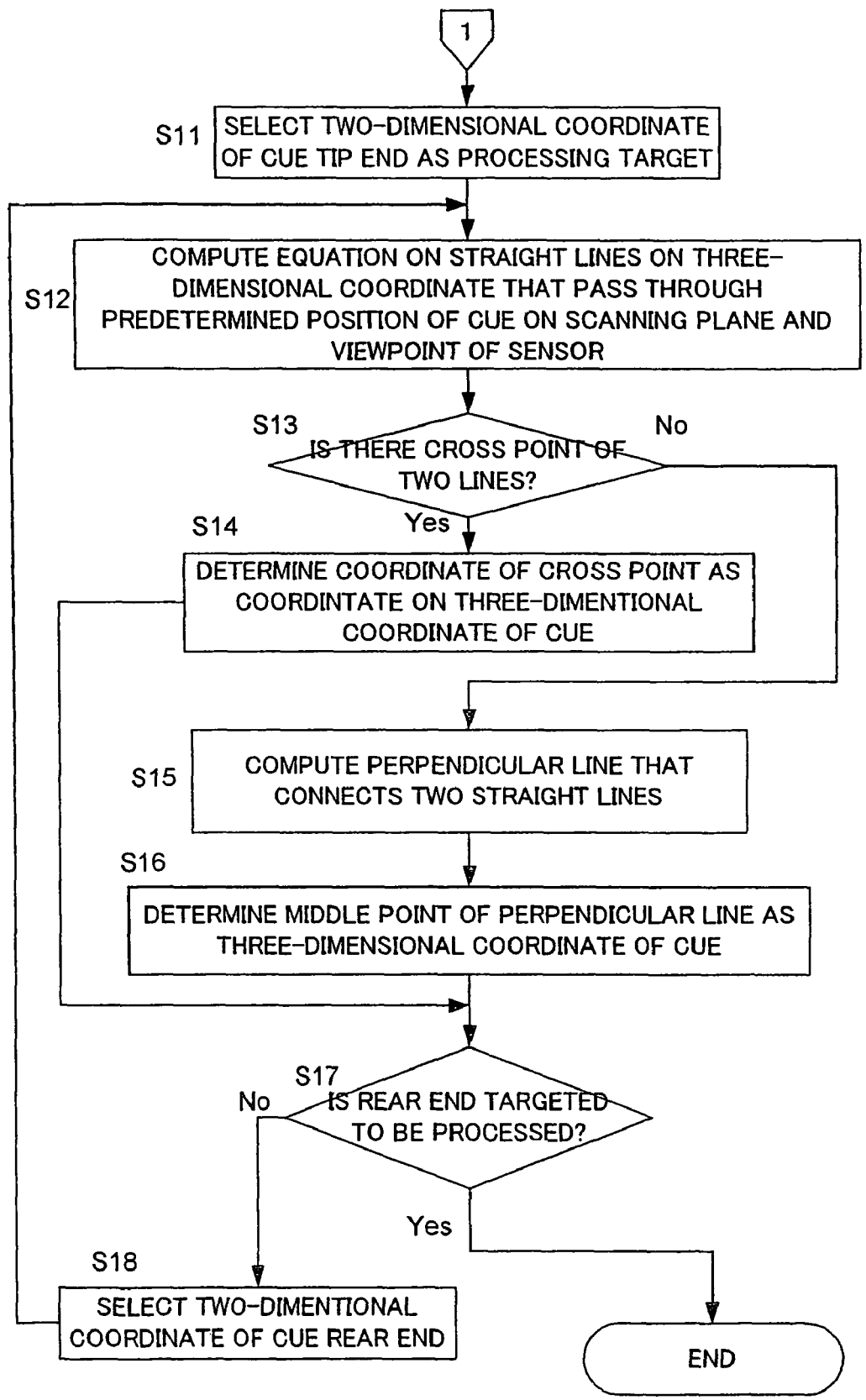

BILLIARD GAME INPUT DEVICE, BILLIARD GAME SYSTEM, GAME INPUT DEVICE, AND COMPUTER PROGRAM

This is a Divisional application of Ser. No. 10/301,316 filed Nov. 21, 2002.

BACKGROUND OF THE INVENTION

1. Field of the Invention

The present invention relates to a billiard game system that causes a player to shoot a simulative ball and an input device and computer program suitable to such a game system.

2. Description of the Related Art

As an input device of a billiard game system that reproduces a feeling of shooting a cue ball, in Japanese Patent Application Laid-Open No. 2001-178966 (hereinafter, referred to as reference 1), there is disclosed an input device comprising: a simulative ball supported by a guiding mechanism; a shooting signal output device for outputting a signal that corresponds to a shooting force when the simulative ball is shot by a cue or its substitute or a displacement speed of the simulative ball; and a shooting point signal output device for outputting a shooting point signal that corresponds to the shot position of the simulative ball.

In Japanese Patent Application Laid-Open No. 2000-93655 (hereinafter, referred to as reference 2), there is disclosed an input device in which: a tip end of a rod simulating a cue is housed in a predetermined case in a state in which the tip end can be moved in its axial direction; a magnet is mounted on the tip end of the rod, and a coil is disposed at the periphery of its tip end; and when the rod moves in the axial direction, a cue ball shooting speed is specified based on a dielectric current generated at the coil.

In U.S. Pat. No. 6,220,963 (hereinafter, referred to as reference 3), there is disclosed an input device comprising: a housing such as a mouse utilized as a computer's pointing device; and a receiving portion mounted on the housing, the receiving portion supporting the tip end of the cue, wherein a cue operation is detected by means of an optical reader and an optical reading roller mounted on the housing or the receiving portion.

In an actual billiard game, there exist a variety of shots for shooting the cue ball in a specific direction off its core such as follow shot, draw shot, or jump shot, and a variety of operations are provided to the cue ball by these shots. However, as in the input device of reference 1, in the case where a simulative ball is supported by a shaft, movement of the simulative ball is restricted more significantly than an actual cue ball according to its support structure. Thus, depending on a position at which the simulative ball is shot (a shooting point) or a shot angle, a feeling when the actual cue ball is shot cannot be reproduced sufficiently.

In the input device described in reference 1, the simulative ball is structured so that the simulative ball can be divided into two sections, i.e., a side at which the player shoots and its opposite side. A hemispherical portion at the side at which the player shoots is connected to a volume detector of the inside of the simulative ball. Then, a shooting point of the simulative ball or an angle at which the ball is shot is detected based on an output of such a volume detector. In the case where the simulative ball itself is thus divided into sections, as the simulative ball itself is displaced, it is difficult to reproduce the feeling when the actual cue ball has been shot and the construction of the simulative ball becomes complicated as well. In addition, in reference 1, there is disclosed an example wherein a pressure sensing film or a pressure sensing rubber is provided on a surface of the simulative ball, thereby detecting a shooting point and an angle at which the ball has been shot. However, in this case as well, the feeling when the simulative ball has been shot changes depending on a material for such a pressure sensing film or pressure sensing rubber, thus it is difficult to reproduce the feeling when the cue ball has been shot in the same way as that described previously.

In the input device of reference 2, no simulative ball essentially exists, and the feeling when the cue ball is actually shot cannot be reproduced. Moreover, the input device of reference 2 is arranged to hold the tip end of the rod simulating the cue in a case. Thus, it is required to rotatably provide the case itself in the horizontal direction or vertical direction around a predetermined fulcrum in order to change the rod operation direction. As a result, the rod operation is restricted to a rotational motion around the fulcrum of the case, and thus the player cannot carry out an operation such that the player shoots a cue in an arbitrary direction relevant to the cue ball. Therefore, rod operation is different from actual cue operation, and in this respect as well, the reality is degraded.

The input device of reference 3 as well is not arranged to shoot the simulative ball, and the feeling when the cue call is actually shot cannot be reproduced. In addition, in the input device of reference 3, a variety of detecting devices are built in the housing or the receiving portion, thus making it necessary to operate the cue while the tip end of the cue is guided by its receiving portion. Thus, a shot using a rest (referred to as a bridge) formed by the player's fingers cannot be carried out, and actual cue operation cannot be sufficiently reproduced. Further, in the device of reference 3, when the receiving portion is pushed down by the cue, a signal indicating that the cue ball has been shot is generated. Such an operation is unnatural, and the reality of shots is further degraded.

SUMMARY OF THE INVENTION

It is an object of the present invention to provide an input device for a billiard game capable of sufficiently reproducing the feeling when a cue ball is shot by improving a structure for supporting a simulative ball. In addition, it is another object to provide a variety of preferred aspects of imparting a further added value to such an input device.

It is another object of the present invention to provide a game system and an input device and computer program suitable to such a game system, the game system being capable of simplifying construction of a simulative ball by making the simulative ball to be shot by a player similar to an actual billiard cue ball to the possible maximum, or alternatively, making it possible to specify the position or the angle and the like at which the simulative ball has been shot by the cue without restricting free movement of the cue, thereby making it possible to sufficiently reproduce the feeling when the actual cue ball is shot. Further, it is another object of the present invention to provide a game system and an input device suitable to such a game system, the game system optimizing ambient environment of the simulative ball for the purpose of detection of a state in which the simulative ball has been shot.

A billiard game input device according to the present invention comprises: a simulative ball provided as an object to be shot by a player; a link portion having a ball axis on which the simulative ball is mounted; a support portion for movably supporting the link portion; and a signal output device for outputting a signal that corresponds to an operation of the link portion, wherein at least one of rotational motion of the simulative ball around an axle as a center of the ball axis and linear motion of the simulative ball in a predetermined range around the axial direction of the ball axis is permitted, thereby solving the above described problem.

According to this input device, in the case where the simulative ball has, been shot in a specific direction off the core, the simulative ball rotates around the ball axis according to a shooting point or an angle at which the ball has been shot, or alternatively, can be moved in the axial direction of the ball axis. By these motions, the feeling such that the simulative ball is escaped is provided to the player, and the feeling when an actual cue ball has been shot in a variety of directions can be sufficiently reproduced.

In the input device according to the present embodiment, the link portion includes a bearing portion supported by the support portion, and the ball axis is engaged with the bearing portion movable in its axial direction and rotatably around the axle, whereby both of the rotational motion and the linear motion may be permitted. In this case, the ball axis rotates along its axle together with the simulative ball, and can slide in the axial direction. There is no need to produce relative motion between the ball axis and the simulative ball, and thus, both of the motions are securely fixed to each other, whereby the durability and reliability of the input device can be improved.

At the ball axis, there may be provided an engagement portion to be movably engaged with the bearing portion in the axial direction. In addition, at both ends of the axial direction of the engagement portion, there may be provided a stopper device for restricting the movement range of the ball axis relevant to the bearing portion. In this case, the range of linear motion of the simulative ball can be restricted within a predetermined range merely by providing the stopper device at the ball axis.

The link portion may be supported by the supported portion so that the ball axis can move between a shot position at which the ball axis extends in a vertically downward direction and a standby position at which the ball axis inclines from the shot position. In this case, when the player shoots the simulative ball, he or she falls in a direction in which the simulative ball has been shot. Such an operation can be achieved by rotatably supporting at least a part of the link portion around a rotational center line orthogonal to the axle of the ball axis by the support portion. According to such a rotational support structure, the support portion can be arranged more compactly than a case in which the simulative ball is moved linearly in a direction in which the ball has been shot. Moreover, a relatively large stroke can be provided to the simulative ball.

In the input device according to the present invention, in the case where the ball axis falls from a shot position to a standby position, when the link portion moves from the shot position to the standby position, it is preferable that there is provided a buffer device for receiving the simulative ball and absorbing motion energy of the simulative ball. By doing this, the noise generated when the simulative ball falls and collides with a substrate of the input device or the like can be reduced, and the possibility that the simulative ball rises again due to its landing reaction can be reduced.

In addition, in the case where there is provided a driving device for restoring the link portion from the standby position to the shot position, the simulative ball or ball axis that has fallen in rearward direction viewed from the player can be easily restored to the shot position. In addition, in the case where the simulative ball is housed under the table top, it would be difficult for the player to raise the simulative ball at the shot position by himself/herself. Thus, it is desirable that such a driving device be provided.

As the signal output device, the input device according to the present invention may comprise a sensor whose output changes depending on whether or not the link portion exists at the shot position. In this case, it is possible to discriminate whether or not the simulative ball at the shot position has been shot based on the sensor output. Further, the input device according to the present invention may comprise a discriminating device for carrying out such discrimination.

As the signal output device, the input device according to the present invention may comprise two sensors whose output changes depending on whether or not the link portion exists at a respective one of two detection positions set between the shot position and the standby position. In this case, when the simulative ball has been shot, it is possible to compute a speed of the simulative ball based on a time interval from a time when an output of one sensor changes to a time when an output of another sensor changes. Further, the input device according to the present invention may comprise a speed computing device for computing such a speed.

As the signal output device, the input device according to the present invention may comprise: a first sensor whose output changes depending on whether or not the link portion exists at the shot position; a second sensor whose output changes depending on whether or not the link portion exists at an intermediate detection position set adjacent to the shot position; and a third sensor whose output changes depending on whether or not the link portion exists at the standby position. In this case, for example, it is discriminated whether or not the simulative ball has been shot based on an output of the first sensor. The movement speed of the simulative ball can be specified based on outputs of at least two of the first to third sensors. Further, the third sensor can be also used to check whether or not the simulative ball exists at its standby position.

A billiard game system according to the present invention comprises: a simulative ball provided movably in a predetermined direction from a predetermined shot position as an object shot by a player; a plurality of image acquiring devices for outputting data on an image obtained by scanning a predetermined detection range set at a side at which the player shoots from the viewpoints different from each other, relevant to the simulative ball at the shot position; a coordinate specifying device for specifying a three-dimensional coordinate of at least two typical points of a cue in a three-dimensional coordinate system set with respect to the detection range, based on data outputted from each image acquiring device; a position/angle specifying device for specifying a shooting point of the simulative ball and a shot angle thereof based on the coordinate of the typical points of the cue specified by the coordinate specifying device; a speed information detecting device for detecting information correlated with the speed of the simulative ball; a speed specifying device for specifying the speed at which the simulative ball has been shot based on the information detected by the speed information detecting device; and a computing device for computing an operation of a virtual cue ball to be displayed on a screen of a predetermine display unit in correspondence with the simulative ball, thereby solving the above described problem.

According to the billiard game system of the present invention, a three-dimensional coordinate of at least two typical points of the cue is obtained based on an image acquired by an image acquiring device. Thus, it is possible to specify where and from which direction the cue comes into contact with the simulative ball without constraining movement of the cue. In this manner, there is no need to constrain the cue for the purpose of detecting the shooting point or the shot angle. In addition, there is no need to enable the simulative ball to be partially displaced or provide a pressure sensing sensor such as a pressure film on its surface in order to specify the shooting point or the shot angle. In this manner, the construction of the simulative ball is simplified, and the simulative ball can be simulated to a cue ball used in actual billiard. According to the billiard game system of the present invention, a simulative ball simulated to an actual cue ball can be shot freely by the cue, and the reality of game is improved, and amusement of the game increases. The construction of the simulative ball is simplified, and there is no need to provide a mechanism for constraining the cue. Thus, the possibility that a problem occurs is lowered concurrently, and there can be provided a billiard game system with its excellent durability and reliability.

In order to specify a direction in which the cue operates in the three-dimensional coordinate system, it is required that at least two points are identified in a three-dimensional space. Therefore, in the present invention, the three-dimensional coordinate of at least two typical points of the cue is specified. These typical points may be specified as two or more points in the same image acquired by each image acquiring device or may be specified as two or more points in images different from each other, the images being acquired with a time lag. Namely, at least two typical points may be specified as two or more points spaced from each other in the three-dimensional coordinate system in the same time or may be specified as two or more points that correspond to times different from each other in the three-dimensional coordinate system. In the former case, two or more points different from each other, of the cue, are selected as typical points. In the latter case, however, positions at which one point (for example, a tip end) on the cue occupies in two or more images different from each other in scanning time can be selected as two or more typical points.

As the speed information detecting device, any detection object or system may be employed as long as it can specify information correlated with the shot speed of the simulative ball. The speed of the simulative ball or an element moving together with the ball may be detected, or alternatively, the cue speed may be detected. An image acquiring device may be used also as a speed information detecting device.

The billiard game system according to the present invention comprises: a simulative ball operation detecting device for detecting the presence or absence of operation from the shot position of the simulative ball; and a discriminating device for discriminating whether or not the simulative ball has been shot based on the detection result of the simulative ball operation detecting device, wherein the position/angle specifying device may specify the shooting point and angle based on the coordinate of the cue at a time when it is discriminated that the simulative ball has been shot.

In this case, it is specified whether or not the simulative ball has been shot from the detection result of the simulative ball operation detecting device, and the shooting point or the shot angle can be precisely specified from the three-dimensional coordinate of the cue at the shot time. The present invention includes both of a case in which computation of the shooting point and the angle are repeatedly executed, utilizing the computation result at a time when the ball has been shot; and a case in which the three-dimensional coordinate at a time when the ball has been shot is acquired, starting computation of the shooting point or the angle. The simulative ball operation detecting device may be used also as the speed information detecting device.

A respective one of the plurality of image acquiring devices outputs data that corresponds to projected images onto different scanning planes from each other, the planes being set in the three-dimensional coordinate system. The coordinate specifying device may comprise: a two-dimensional coordinate acquiring device for acquiring a two-dimensional coordinate of points that correspond to the typical points in a cue image included in the image scanned by each image acquiring device; a straight line specifying device for referring to information associated with the three-dimensional coordinate assigned in advance to a respective one of the viewpoint and the scanning plane, thereby converting into the three-dimensional coordinate system the two-dimensional coordinate of each point acquired by the two-dimensional coordinate acquiring device, and then, specifying a straight line that connects each point at which the three-dimensional coordinate is assigned and a viewpoint that corresponds to the scanning plane to which such each point belongs; and a typical point coordinate determining device for determining the three-dimensional coordinate of each of the typical points on the cue from a mutual relationship between the specified straight lines.

In this case, the three-dimensional coordinate of typical points of the cue in the detection range defined by the three-dimensional coordinate system can be specified through a geometrical process for obtaining an equation for a straight line passing through the viewpoint of each image acquiring device and typical points on the scanning plane acquired by these image acquiring devices.

In addition, in the typical point coordinate determining device, the three-dimensional coordinate of a cross point of at least two straight lines, or alternatively, a middle point of a perpendicular line common to at least two straight lines may be determined as the three-dimensional coordinate of each of the typical points. In this case, even in the case where an error or the like occurs due to characteristics of an image acquiring device and straight lines do not cross each other, A point approximate thereto is acquired, whereby the three-dimensional coordinate of typical points of the cue can be specified.

The two-dimensional coordinate acquiring device extracts an image of the cue from a difference between a base image that corresponds to a background image obtained when the cue is omitted from the detection range and an image including the cue, whereby the two-dimensional coordinate of at least two points of the extracted image may be acquired. In this case, a difference from the base image is sampled, whereby the detection precision of the cue image can be improved.

A respective one of the plurality of image acquiring devices scans repeatedly the detection range and outputs each scanned image data. The two-dimensional coordinate acquiring device may comprise a base image updating device for specifying the range of at least part of the background in the latest image based on a difference between the latest image and past image, and then, replacing the base image relevant to the specified range with the content of the latest image.

In this case, at least part of the base image is serially updated. Thus, a change or the like of brightness at the periphery of the simulative ball is reflected on the base image, whereby the detection precision of the cue image can be improved.

In the billiard game system according to the present invention, the position/angle specifying device may specify a shot angle relevant to the vertical direction and a shot angle relevant to the horizontal direction, respectively. In this manner, the angle at which the simulative ball has been shot can be specified in a three-dimensional manner.

The speed information detecting device may comprise two sensors whose output changes according to the presence or absence of the simulative ball in a respective one of two detection positions spaced from each other with respect to the predetermined direction or a member moving together with the simulative ball. The speed specifying device detects a time interval from a time when an output signal of one sensor changes accompanied with movement of the simulative ball to a time when an output signal of the other sensor changes, whereby the speed at which the simulative ball has been shot may be computed based on the detection result. In this case, the speed at which the simulative ball has been shot can be computed by utilizing a sensor such as a publicly-known photo sensor or proximity sensor.

The billiard game system according to the present invention comprises: a link portion having a ball axis on which the simulative ball is capable of being mounted; and a support portion for movably supporting the link portion, wherein the sensor of the speed information detecting device may be provided so that the output of the sensor changes depending on whether or not the link portion exists at a respective one of the two detection positions set in the movement range of the link portion. In this case, part of the link portion to be linked with the simulative ball is targeted to be detected by the speed information detecting device. Thus, there is no need to incorporate a speed detecting sensor or the like in the simulative ball, or alternatively, to dispose a speed detecting sensor or the like in the vicinity of the simulative ball. In this manner, a space for the periphery of the simulative ball can be provided more significantly as a space for shooting the simulative ball. There is no possibility that detection range caused by the image acquiring device is restricted by the speed information detecting sensor.

The simulative ball operation detecting device may comprise a sensor whose output changes depending on whether or not the simulative ball exists at the shot position. It is possible to simply discriminate whether or not the simulative ball has been shot merely by monitoring a change in output of this sensor. The sensor of the simulative ball operation detecting device may be used also as apart of a sensor configuring the speed information detecting device.

Further, the billiard game system according to the present invention is configured as an arcade game machine comprising a predetermined chassis. At the chassis, a table portion simulating a part of the table of a billiard board is provided. An upper face of the table portion functions as a table face. A space opening forwardly of the table portion is formed by the table face and a hood covering the same. The simulative ball at the shot position can move between the shot position and a standby position which is retracted to the depth of the space further than the shot position. A respective one of the plurality of image acquiring devices may be disposed in or under the hood in a state in which the scanning direction is oriented to be more downward than a horizontal direction. In such an arcade game machine, the player inserts a cue forwardly of the table portion, thereby making it possible to play a billiard game while shooting the simulative ball. In addition, the periphery of the detection range caused by the image acquiring device is surrounded by a table face or hood. Thus, a danger that an element other than cue shot toward the simulative ball is included in the scanning range of the image acquiring device is reduced so that the cue image can be specified relatively easily. Moreover, the scanning direction of the image acquiring device is oriented to be more downward than the horizontal direction. Thus, the scanning range is hardly affected by upward external light.

A game input device according to the present invention solves the above described problem by a game input device comprising: a simulative ball movably provided in a predetermined direction from a predetermined shot position as an object to be shot by a player; a plurality of image acquiring devices for outputting data on an image obtained by scanning a predetermined detection range set in a direction where the player shoots from different viewpoints from each other relative to the simulative ball at the shot position; a coordinate specifying device for specifying a three-dimensional coordinate of at least two typical points, of a rod shaped member in a three-dimensional coordinate system set with respect to the detection range based on the data outputted from a respective one of the image acquiring devices; and information generating device for generating information required to specify a state in which the simulative ball has been shot, based on a coordinate of the typical points of the rod shaped member specified by the coordinate specifying device.

According to this input device, as has been described with respect to the above described billiard game system, the three-dimensional coordinate of at least two typical points of the rod shape member is obtained based on an image acquired by an image acquiring device. Thus, the shooting point of the simulative ball, the shot angle thereof, or alternatively, the shot speed thereof can be specified without constraining movement of the rod shaped member. In this manner, an input device suitable to the above described billiard game system can be provided.

The input device according to the present invention further comprises: a speed information detecting device for detecting information correlated with a speed of the simulative ball; and a speed specifying device for specifying a speed at which the simulative ball has been shot, based on information detected by the speed information detecting device, wherein the information generating device may generate information correlated with the shooting point of the simulative ball and the shot angle thereof.

In this case, the shooting point of the simulative ball and the shot angle can be specified based on an image acquired by the image acquiring device. In addition, the speed at which the simulative ball has been shot can be specified based on information detected by the speed information detecting device. In this manner, an input device which is more suitable to the above described billiard game system can be provided.

Further, the game input device according to the present invention can include the following aspects in correspondence with the preferred embodiments of the above described billiard game system.

That is, a respective one of the plurality of image acquiring devices outputs data that corresponds to each projected image onto scanning planes which are different from each other, the scanning planes being set in the three-dimensional coordinate system. The coordinate specifying device may comprise: a two-dimensional coordinate acquiring device for acquiring a two-dimensional coordinate of each point that correspond to each of the typical point of an image of the rod shaped member included in an image scanned by each image acquiring device; a straight line specifying device for referring to information associated with the three-dimensional coordinate assigned in advance to a respective one of the viewpoint and the scanning plane, thereby converting the two-dimensional coordinate of each point acquired by the two-dimensional coordinate acquiring device into the three-dimensional coordinate system, and then, specifying a straight line that connects each point at which the three-dimensional coordinate has been assigned and a viewpoint that corresponds to the scanning plane to which each point belongs; and a typical point coordinate determining device for determining a three-dimensional coordinate of the typical points on the rod shaped member from a mutual relationship between the specified straight lines.

The typical point coordinate determining device may determine a three-dimensional coordinate of a cross point of at least two straight lines, or alternatively, a middle point of perpendicular lines common to at least two straight lines as a three-dimensional coordinate of the typical points. In this case, even in the case where an error or the like occurs due to characteristics of an image acquiring device and each straight line does not have a cross point, a point approximate to such a cross point is acquired, whereby the three-dimensional coordinate of the typical points of the rod shaped member can be specified.

The two-dimensional coordinate acquiring device extracts an image of the rod shaped member from a difference between a base image that corresponds to a background image obtained when the rod shaped member is excluded from the detection range and an image including the rod shaped member, whereby a two-dimensional coordinate of at least two points of the extracted image may be acquired.

A respective one of the plurality of image acquiring devices outputs data on image obtained by repeatedly scanning the detection range. The two-dimensional coordinate acquiring device may comprises a base image updating device for specifying at least a part of a range of the background in the latest image based on a difference between the latest image and the past image, and then, replacing a base image relevant to the specified range with the content of the latest image.

The information generating device may specify a shot angle relevant to the vertical direction and a shot angle relevant to the horizontal direction, respectively.

The speed information detecting device comprises two sensors whose output changes according to the presence or absence of the simulative ball or a member moving together with the simulative ball in a respective one of two detection positions spaced from each other with respect to the predetermined direction. The information generating device detects a time interval from a time when an output signal of one sensor changes with movement of the simulative ball to a time when an output signal of the other sensor changes, whereby a speed at which the simulative ball has been shot may be computed based on the detection result.

The game input device according to the present invention comprises: a link portion having a ball axis on which the simulative ball is capable of being mounted; and a support portion for movably supporting the link portion, wherein the sensors of the speed information detecting device may be provided so that their outputs change depending on whether or not the link portion exists at a respective one of the two detection positions set in the movement range of the link portion.

The simulative ball operation detecting device may comprise a sensor whose output changes depending on whether or not the simulative ball exists at the shot position. The sensor may be used also as a part of the sensor that configures a speed information detecting device.

The game input device according to the present invention is suitably configured as an input device for a billiard game, and may be utilized as an input device for another game.

A computer program according to the present invention is directed to a computer program for recognizing a rod shaped member poked in the detection range based on data on an image outputted from a respective one of a plurality of image acquiring devices for scanning a predetermined detection range from viewpoints different from each other, the computer program causing a computer to function as: a coordinate specifying device for specifying a three-dimensional coordinate of at least two typical points of the rod shaped member in a three-dimensional coordinate system set with respect to the detection range based on data outputted from each image acquiring device; and an information generating device for generating information required to specify a state in which a predetermined target disposed in the three-dimensional coordinate system has been shot by the rod shaped member based on a coordinate of the typical points of the rod shaped member specified by the coordinate specifying device, respectively, thereby solving the above described problem.

This computer program is executed by a computer, whereby the computer can function as a variety of devices of the input device according to the present invention.

BRIEF DESCRIPTION OF THE DRAWINGS

FIG. 10 is a flow chart following that of FIG. 9;

DESCRIPTION OF THE PREFERRED EMBODIMENT

Figure 1:
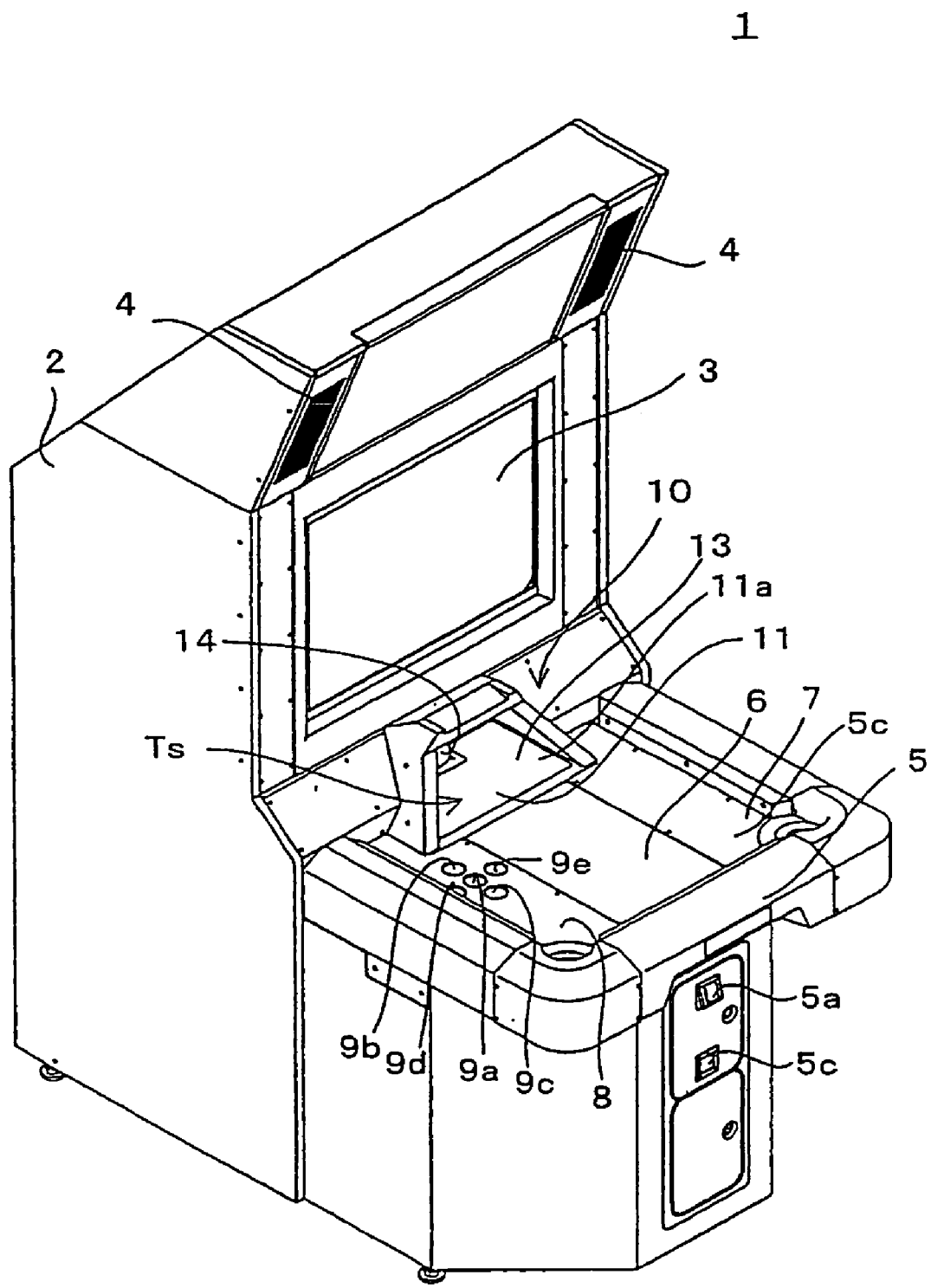
FIG. 1 is a perspective view showing a billiard game machine comprising an input device according to one embodiment of the present invention.

FIG. 1 is a perspective view showing an appearance of a billiard game machine according to one embodiment of the present invention. This billiard game machine 1 (hereinafter, simply referred to as a game machine) is composed as a commercially available arcade game machine installed in an amusement space of a so called game shop or the like. The game machine 1 has a chassis 2; a monitor 3 mounted at the upper part of the chassis 2; and speakers 4, 4 mounted upwardly thereof. At the frontal side of the chassis 2, there is provided a table portion 5 simulating a table of an actual billiard board. A coin entry port 5a and a return port 5b are provided in front of the table portion 5.

At the center of an upper face 5c of the table portion 5, a stuff cloth 6 is laid from the frontal side to the depth. An explanatory panel 7 and a control panel 8 are provided respectively at the right and left sides thereof. Five operating buttons 9a to 9e consisting of push button switches are provided on the control panel 8. The number and location of the operating buttons may be changed as required. In an example of FIG. 1, an OK button 9a is provided at the center of the panel, and an up button 9b, a down button 9c, a left button 9d, and a right button 9e are provided so as to surround the OK button 9a longitudinally and transversely.

An input device 10 according to the present invention is provided at the rear of the table portion 5. The input device 10 has; a base portion 11 disposed so as to be embedded in the table portion 5; and a top portion 12 provided so as to cover the base portion 11. An upper face 11a of the base portion 11 is identical to an upper face 5c of the table portion 5 (precisely identical to the stuff cloth 6), and a table face Ts is composed of these upper faces 5c and 11a. A space 13 is provided between the table face Ts and top portion 12, and a simulative ball 14 is disposed there. The space 13 opens forwardly of the chassis 2. A player can shoot the simulative ball 14 by inserting a cue (not shown) into the space 13 through its opening. As a cue of the game machine 1, a real cue used in actual billiard may be used or its substitute may be used. Any rod shaped member extending straightway can be used as a cue.

Figure 2:
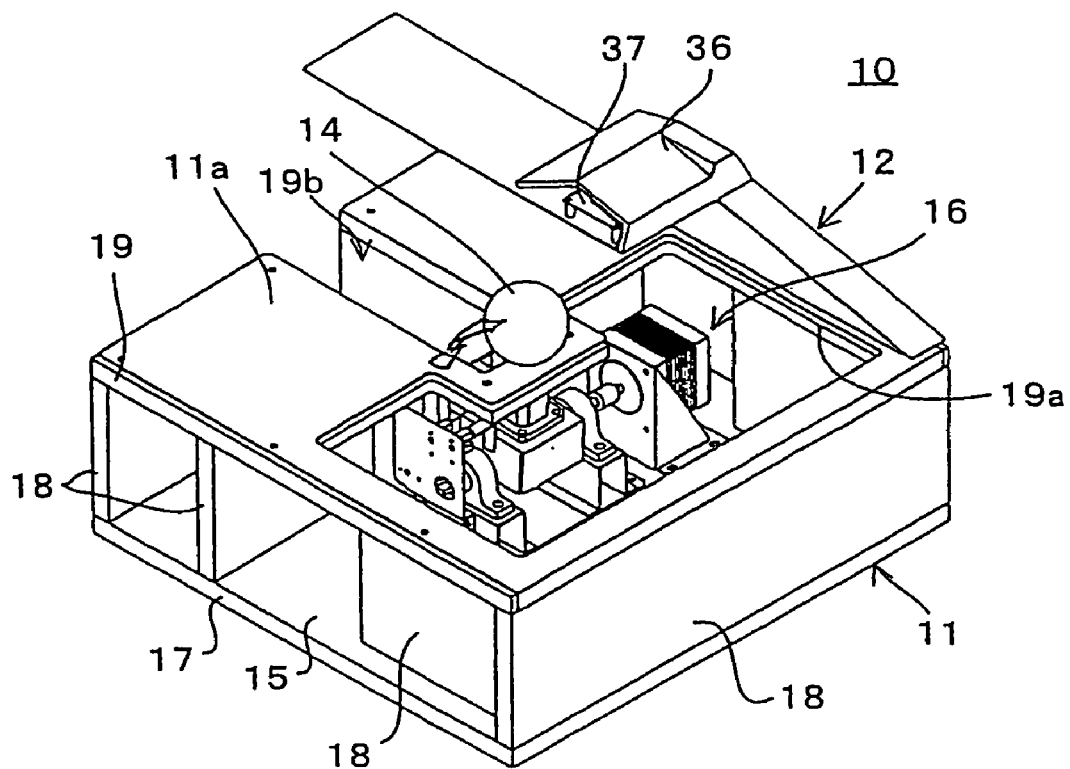
FIG. 2 is a perspective view showing the input device provided at the game machine of FIG. 1, a part of which is shown in a cutout manner.
Figure 3:
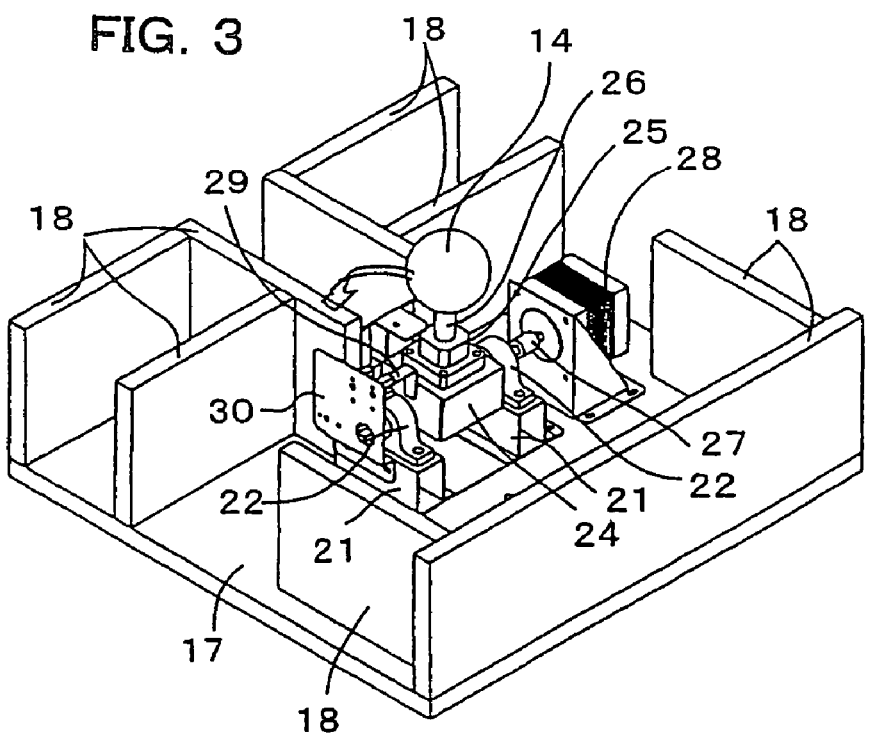
FIG. 3 is a perspective view showing an internal structure of a base portion provided at the input device of FIG. 2.

FIG. 2 is a perspective view showing the top portion 12 of the input device 10, a part of which is shown in a cutout manner. FIG. 3 is a perspective view showing an internal structure of the base portion 11. The base portion 11 has a main body 15; and a support mechanism 16 disposed in the inside of the main body 15, the support mechanism 16 supporting the simulative ball 14. The main body 15 has a substrate 17, wall plates 18 . . . 18 suitably mounted on the substrate 17 and a table top 19 mounted at the upper end of the wall plate 18. An extraction window 19a is provided on the table top 19. This extraction window 19a is covered with a semitransparent cover 20 (refer to FIG. 5).

The support mechanism 16 movably supports the simulative ball 14 between a shot position on the table top 19 and a standby position that falls at the rear of the game machine 1 passing through an opening 19b of the table top 19, as indicated by the arrow in FIG. 2 and FIG. 3. In addition, this mechanism 16 restores the simulative ball 14 from the standby position to the shot position. A detailed description of the support mechanism 16 is given below.

Figure 4:
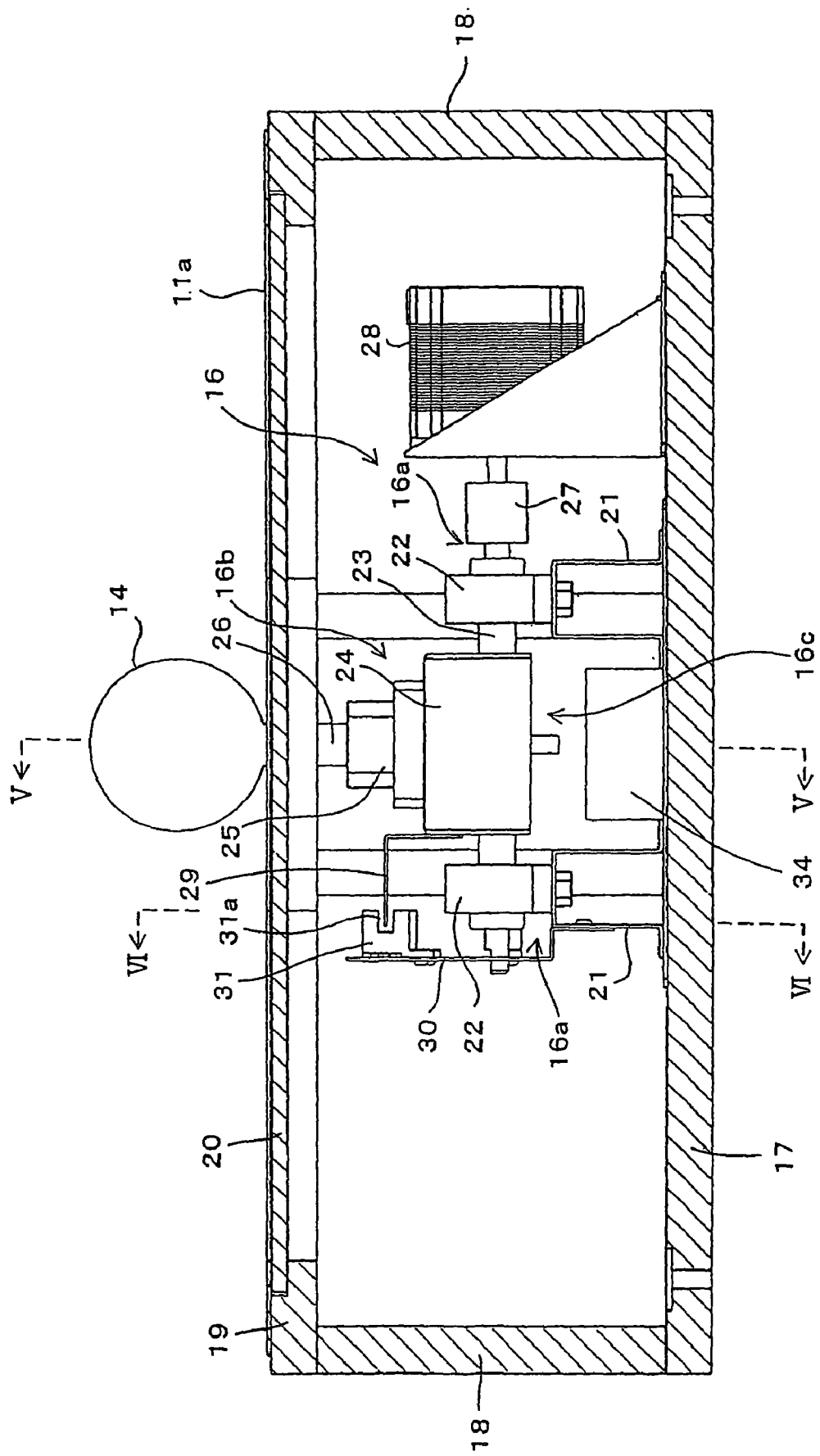
FIG. 4 is a longitudinal cross section view taken along a transverse direction of the base portion of FIG. 3.
Figure 5:
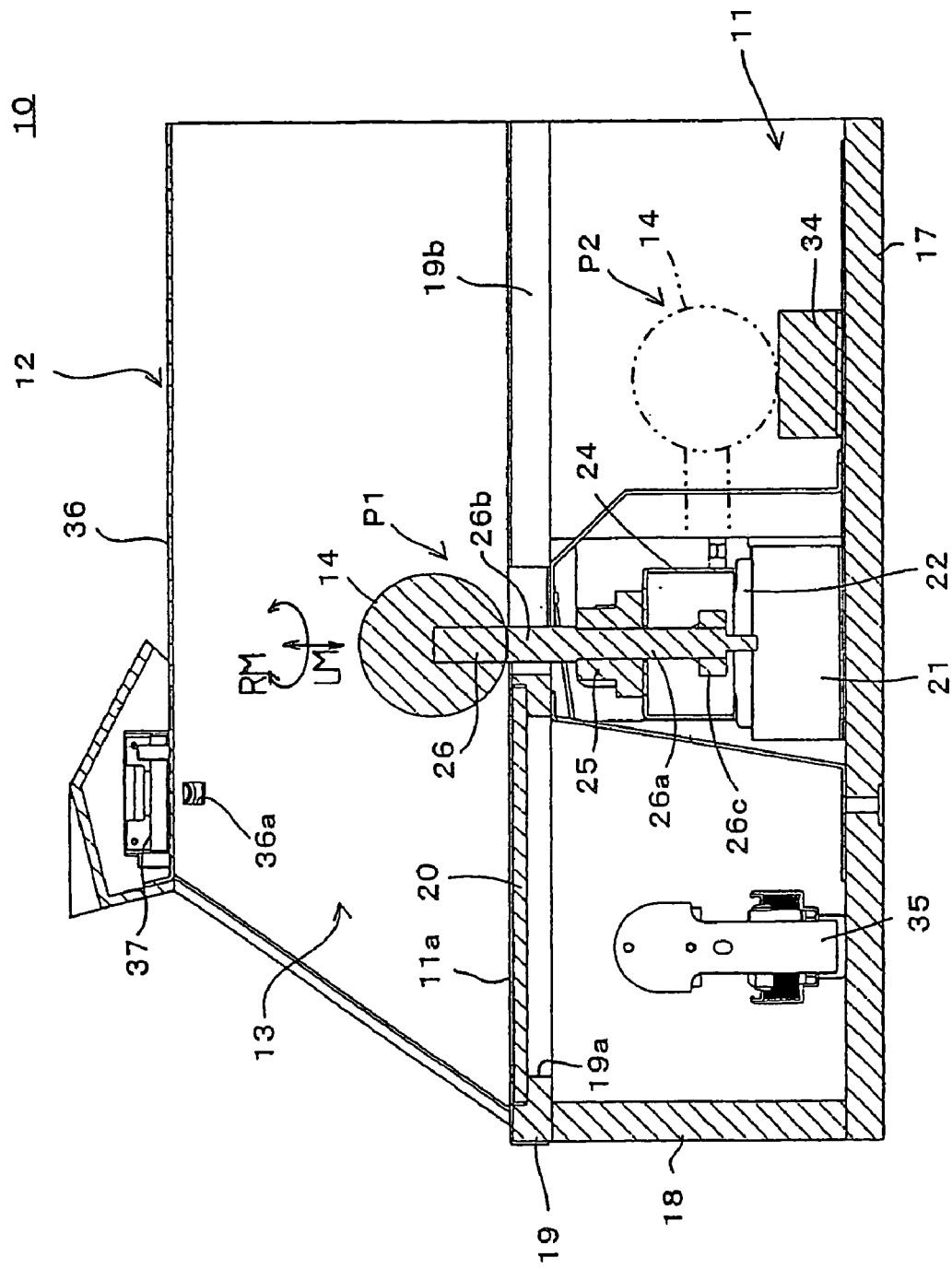
FIG. 5 is a sectional view taken along the line V-V of FIG. 4.

As shown in FIG. 4 and FIG. 5, the support mechanism 16 has: a pair of bearings 22, 22 mounted on a substrate 17 via a bracket 21; a bearing base 24 turnably supported by these bearings 22, 22 via spindles 23, 23; a bearing 25 fixed to the upper end of the bearing base 24; and a ball axis 26 inserted into the bearing 25. The simulative ball 14 is fixed at the tip end of the ball axis 26, and the center of the simulative ball 14 is positioned on the axle of the ball axis 26. A total mass of the simulative ball 14 and ball axis 26 is equal to that of the cue ball used in actual billiard. In addition, the diameter of the simulative ball 14 is equal to that of the cue ball used in actual billiard. A material for the simulative ball 14 may be the same as that for actual cue ball.

As is evident from FIG. 5, the ball axis 26 has: an engagement portion 26a that is slidable along the axial direction and rotatably engaged around the axle relevant to the bearing 25; a large diameter portion 26b having its diameter greater than the engagement portion 26a; and a flange 26c fixed at the lower end of the engagement portion 26a. A stepped portion between the large diameter portion 26b and the engagement portion 26a comes into contact with the upper end of the bearing 25, whereby a drop of the ball axis 26 is inhibited. The engagement portion 26a is formed to be longer than engagement length of the bearing 25. Therefore, the simulative ball 14 can be pulled up together with the ball axis 26 until the flange 26c comes into contact with the upper end of the bearing base 24. The simulative ball 14 and ball axis 26 can rotate integrally relevant to the bearing 25.

In this manner, the simulative ball 14 is provided movably in the axial direction of the ball axis 26 supporting the ball refer to the arrow LM of FIG. 5) and rotatably round the axle of the ball axis 26 (refer to the arrow RM). Thus, when a player shoots the simulative ball 14 off its core in order to apply a so called spin, the simulative ball 14 can escape vertically or rotate according to the degree of displacement of such a shot. In this manner, the feeling of shooting can be simulated to the feeling when an actual cue ball has been shot in spite of a construction in which the simulative ball 14 is constrained by the support mechanism 16.

Figure 6:
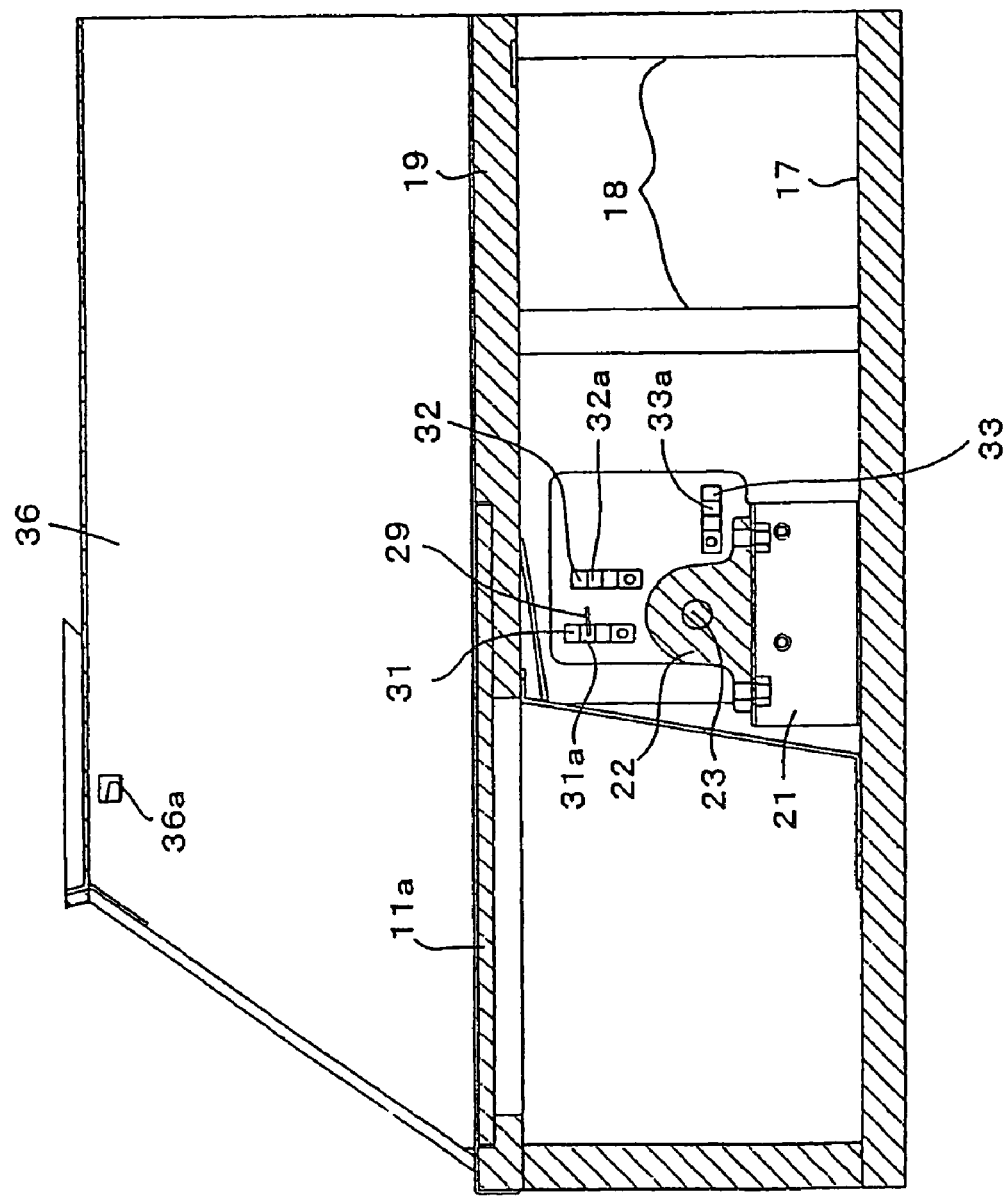
FIG. 6 is a sectional view taken along the line VI-VI of FIG. 4.

As shown in FIG. 4, the support mechanism 16 has a pair of spindles 23 and a motor 28 connected via a coupling 27. In this manner, the simulative ball 14 can be restored from a standby position P2 (a position indicated by a virtual line in FIG. 5) to a shot position P1 (a position indicated by a solid line in FIG. 5) by the power of the motor 28. In addition, a detection plate 29 is mounted on a side face of the bearing base 24 of FIG. 4 (left side face of FIG. 4). As shown in FIG. 6, a sensor support plate 30 is mounted on the bracket 21, and three photo sensors 31 to 33 are mounted on the sensor support plate 30. These photo sensors 31 to 33 have slit shaped sensing portions 31a, 32a, and 33a. The simulative ball 14 rotates around the spindle 23, whereby the detection plate 29 can be protruded or recessed relevant to the sensing portion 31a, 32a, or 33a of the photo sensor 31, 32, or 33. When the simulative ball 14 is set at its shot position, the detection plate 29 is inserted into the sensing portion 31a of a first photo sensor 31, whereby an output signal of the first photo sensor 31 is set to ON, and output signals of the other photo sensors 32 and 33 are set to OFF. When the simulative ball 14 starts rotation toward its standby position, the detection plate 29 passes through the sensing portion 32a of the second photo sensor 32, while the output signal of the photo sensor 32 is set to ON. When the simulative ball 14 reaches its standby position, the detection plate 29 is inserted into the sensing portion 33a of the third photo sensor 33, and the output signal of the photo sensor 33 is set to ON. The first photo sensor 31 functions as a simulative ball operation detecting device and a speed information detecting device. The second photo sensor 32 functions as a speed information detecting device. Other sensors such as a proximity switch may be used instead of the photo sensors 31 to 33. However, in order to guarantee smooth movement of the simulative ball 14, it is desirable that a sensor be of non-contact type.

In the above support mechanism 16, the bearings 22, 22 function as a support portion 16a, and spindles 23, 23, bearing base 24, bearing 25, ball axis 26, and detection plate 29 function as a link portion 16b, respectively. A bearing portion 16c is composed of the bearing base 24 and bearing 25. In addition, the large diameter portion 26b of the ball axis 26 and the flange 26c correspond to a stopper device, the motor 28 corresponds to a driving device, a pad 34 corresponds to a buffering device, and an illumination lamp 35 corresponds to an illumination device, respectively.

As shown in FIG. 2, a top portion 12 has: a hood 36 that covers a space 13 formed between the top portion 12 and an upper face 11a (corresponding to a table face) of a base portion 11; and a pair of image sensors (image acquiring device) 37, 37 incorporated in the hood 36. The image sensor 37 scans a cue shot toward the simulative ball 14, and outputs the scanned image as image data of predetermined dot number and predetermined gradations. A rectangle-shaped, punched hole 36a restricting the viewing field of each image sensor 37 to a predetermined range, for example, is formed at the hood 36. The hood 36 functions as a device for suppressing an effect of external light on the range scanned by the image sensor 37. In addition, this hood 36 also functions as a device for restricting the range of access of the cue to the simulative ball 14 so that the cue shooting the simulative ball 14 always passes through the range detected by the image sensors 37, 37.

A contrast between a cue when seen from the image sensor 37 and a cover 20 of its background increases due to the illumination light from the above described illumination lamp 35, and the cue recognition rate is improved. The cover 20 scatters illumination light from the illumination lamp 35, and the brightness of the cue background portion is uniformed. As an image sensor 37, there can be utilized a 32 dots×32 dots version of an artificial retina LSI available from Mitsubishi Electric & Machinery Co., Ltd., for example.

Figure 7A:
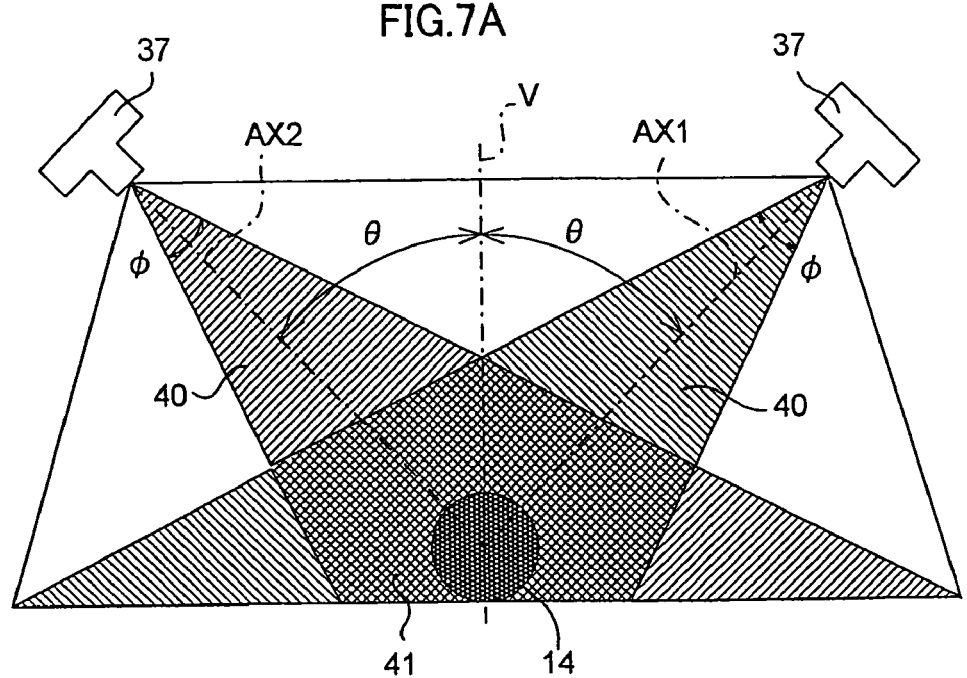
FIG. 7A and FIG. 7B are views showing disposition of an image sensor.
Figure 7B:
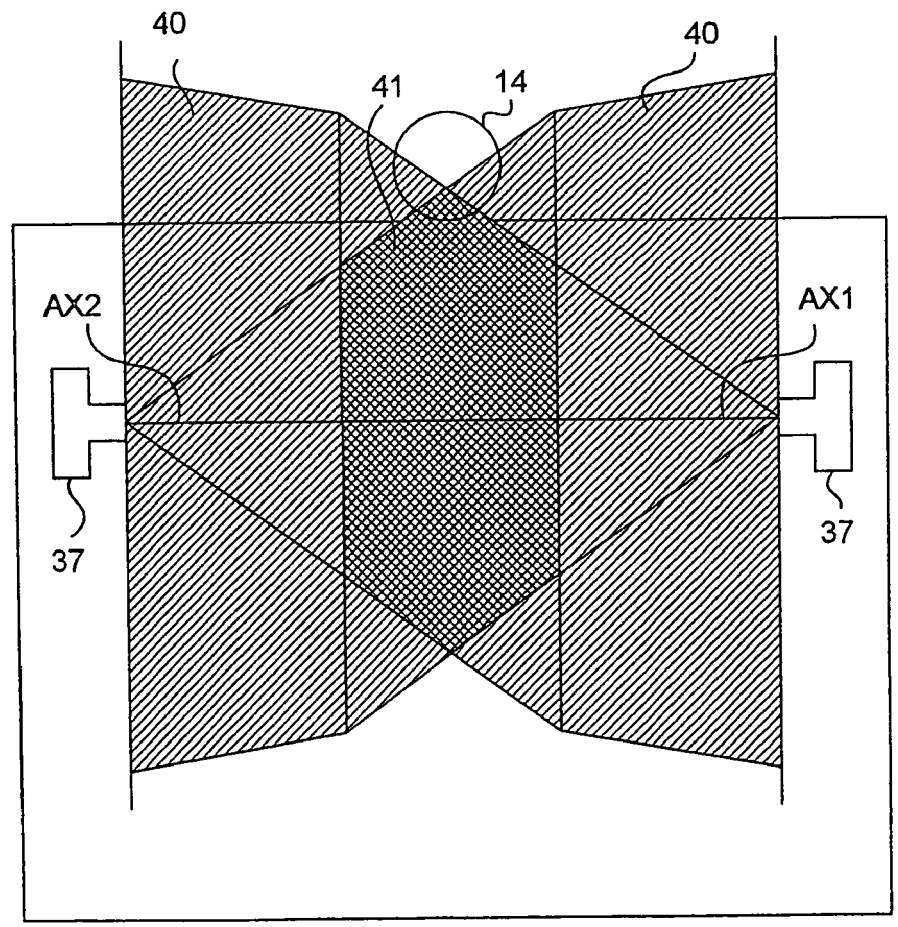

FIG. 7A and FIG. 7B show a relationship between disposition and viewing field of a pair of image sensors 37. FIG. 7A is a view showing a state seen from the frontal side of the game machine 1. FIG. 7B is a view showing a state seen from the upward direction. The viewing fields (scanning range) 40, 40 of each image sensor 37 are as shown by hatching, and the superimposed range of the viewing fields of both sensors 37 is obtained as a cue detection range 41. As shown in FIG. 7A, the image sensors 37, 37 are disposed so that the respective optical axes AX1, AX2 pass through the center position of the simulative ball 14 viewed from the frontal side of the game machine 1 and the optical axes AX1, AX2 are inclined at an angle θ laterally equal to each other relevant to a vertical line V passing through the center of the simulative ball 14. The angle θ may be properly set, and is set at 45 degrees, for example. A viewing angle φ of each image sensor 37 is set to 40 degrees, for example. In addition, as shown in FIG. 7B, the image sensors 37, 37 are disposed at the same position with respect to the forward/backward direction of the game machine 1, and the respective viewing fields 40 extend forwardly of the game machine 1 (to the lower side of FIG. 7B) from the vicinity of the frontal end of the simulative ball 14. The dispositions of FIG. 7A and FIG. 7B are provided as one example, and various modifications can occur. For example, one image sensor 37 may be disposed from the top of the simulative ball 14 to the vertical downward direction, and the other image sensor 37 may be disposed from the left side or right side of the simulative ball 14 to the horizontal direction.

Figure 8:
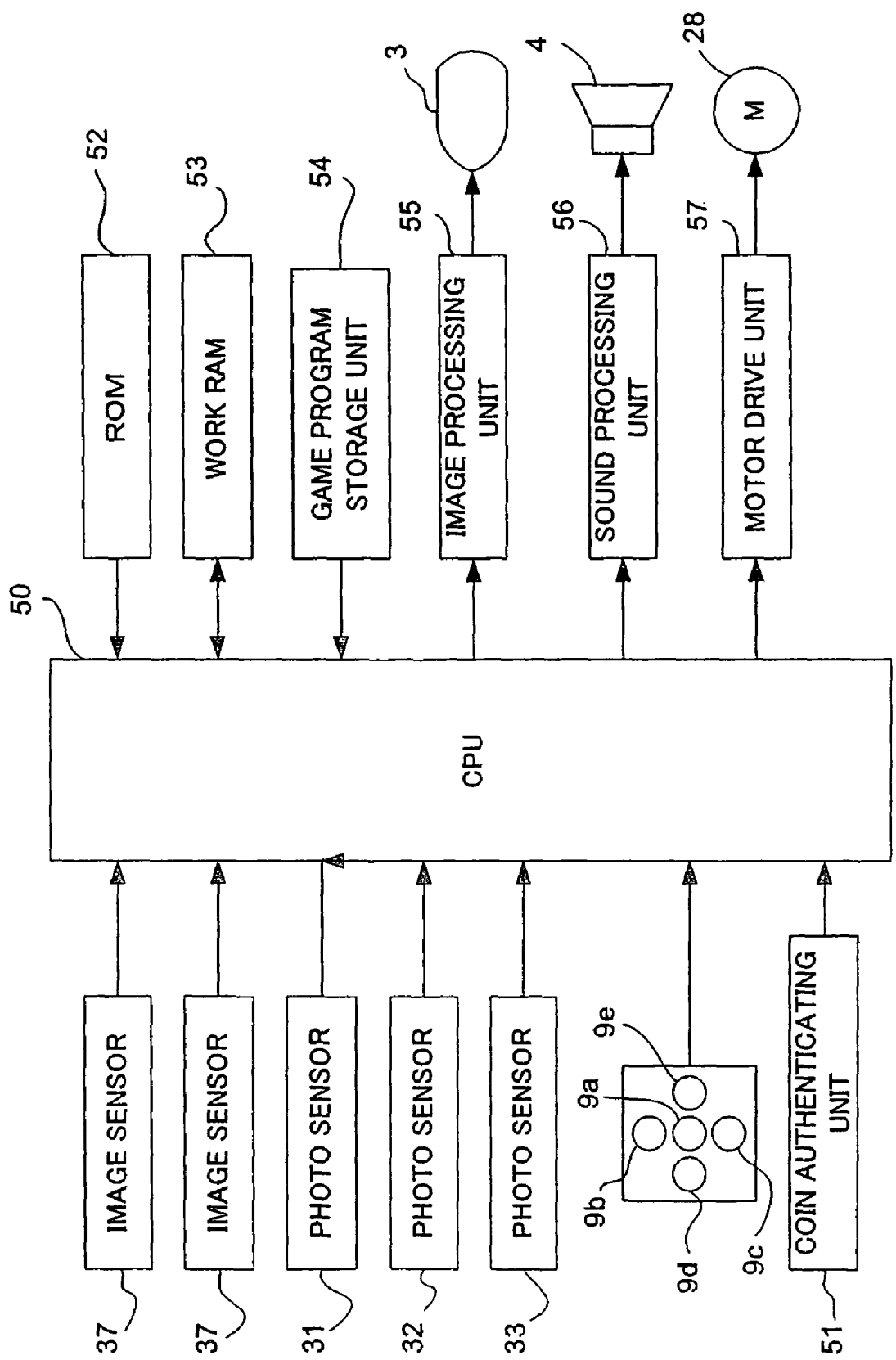
FIG. 8 is a block diagram depicting a construction of a control system in the billiard game machine of FIG. 1.

FIG. 8 is a block diagram depicting a construction of a control system in the game machine 1. The game machine 1 comprises a CPU 50 composed of microprocessors. In the CPU 50, as an input device, there are provided: the above described operating buttons 9a to 9c; photo sensors 31 to 33; image sensors 37, 37; and a coin authentication unit 51. The coin authentication unit 51 judges the truth or falseness of coin entered through a coin entry port 5a (refer to FIG. 1). In the case where a true coil is entered, this unit outputs a predetermined coin entry signal to the CPU 50. When a signal indicating that a predetermined number of true coins have been entered is outputted from the coin authentication unit 51, a predetermined billiard game is started under the control of the CPU 50. An interface unit is properly provided between each of these input devices and the CPU 50, although not shown.

In addition, to the CPU 50, there are connected: a ROM 52 having recorded therein a program for controlling basic operations such as startup processing of the game machine 1; a work ROM 53 for providing a work region to the CPU 50; a game program storage unit 54 having recorded therein a variety of programs and data required to execute a predetermined billiard game in the game machine 1; an image processing unit 55 for depicting an image on a video memory (not shown) in accordance with an instruction from the CPU 50, and converting the depicted image into a video reproduction signal, thereby outputting the converted video reproduction signal to a monitor 3; a sound processing unit 56 for carrying out pronunciation processing according to an instruction from the CPU 50, thereby outputting a sound reproduction signal to a speaker 4; and a motor drive unit 57 for driving a motor 28 of the input device 10 in accordance with an instruction from the CPU 50. For the game program storage unit 54, there can be used a variety of computer readable storage media including a magnetic storage medium such as a nonvolatile semiconductor storage device or a hard disk, for example, or an optical storage medium such as DVD-ROM or CD-ROM.

Now, a variety of processing functions executed by the CPU 50 based on a program recorded in the game program storage unit 54 will be described here.

Figure 9:
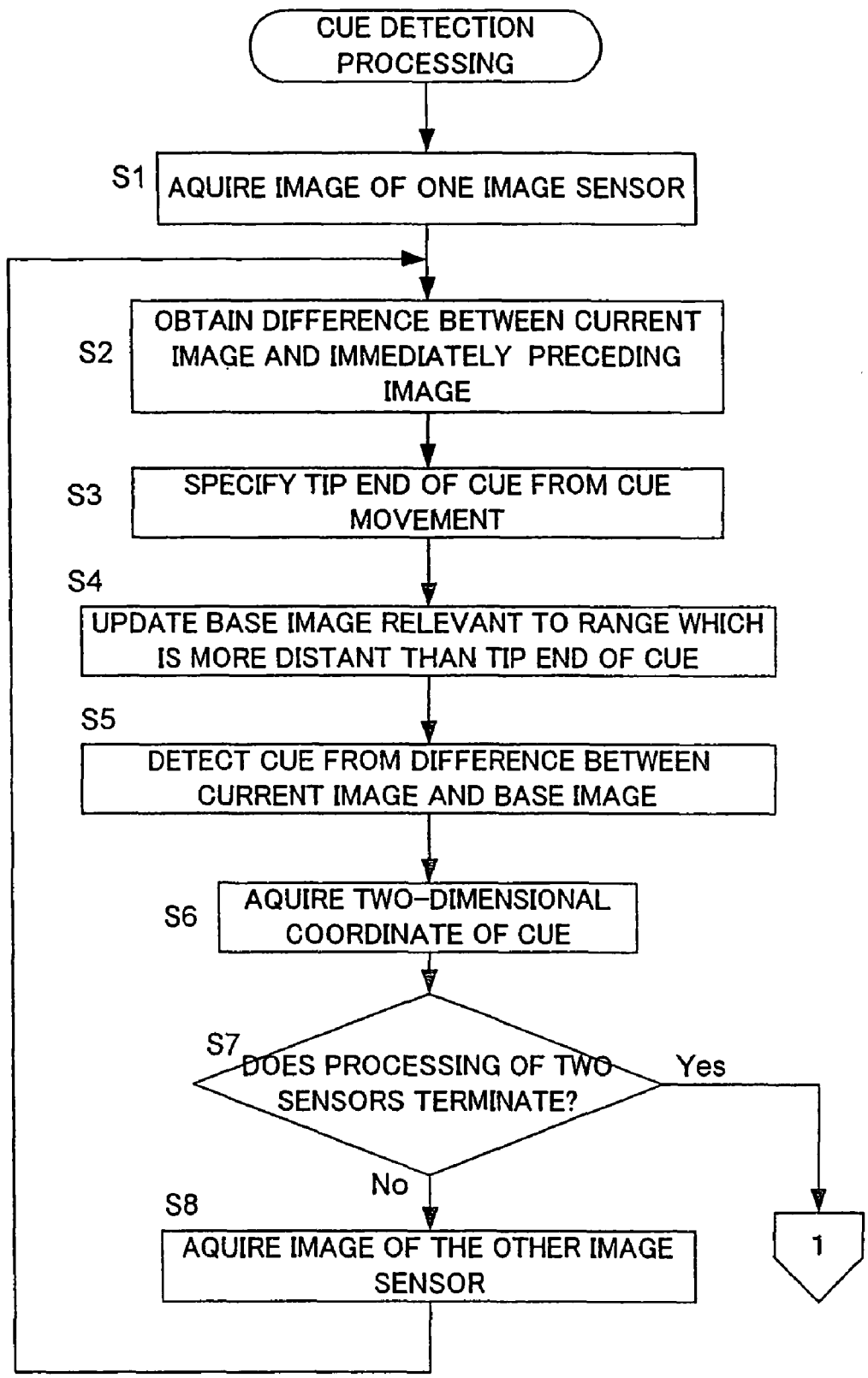
FIG. 9 is a flow chart showing procedures for cue detection processing executed by a CPU of FIG. 8.

FIG. 9 and FIG. 10 are flowcharts showing procedures for cue detection processing executed by the CPU 50 to detect a cue based on an image outputted from the image sensor 37. This cue detection processing is repeatedly executed in a predetermined cycle (for example, a cycle of 60 times per second). This detection processing includes: processing for acquiring a two-dimensional coordinate of a cue image included in a two-dimensional image acquired by each image sensor 37 (steps S1 to S8); and processing for obtaining a three-dimensional coordinate concerning two typical points on a cue based on the acquired two-dimensional coordinate (steps S11 to S18).

Figure 11A:
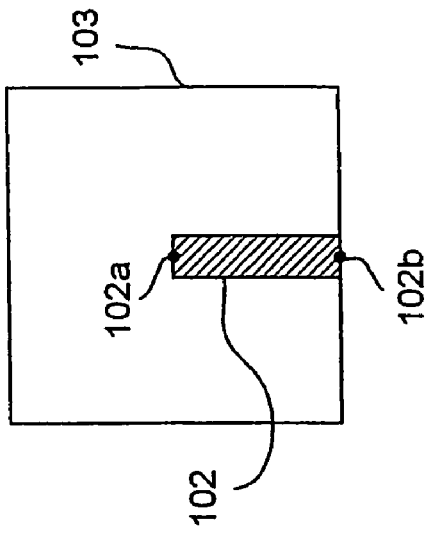
FIG. 11A to FIG. 11F are views showing an example of image processing executed by the processing of FIG. 9.

An object of the processing for acquiring the two-dimensional coordinate of the cue is to obtain an image 103 on a difference between a base image 100 shown in FIG. 11A and an image 101 including a cue image 102, and then, obtain a two-dimensional coordinate of the cue image 102 in the image 103. As its preprocessing, this processing further includes processing for serially updating the base image 100 (steps S2 to S4). Hereinafter, a description will be given in order.

Figure 11B:
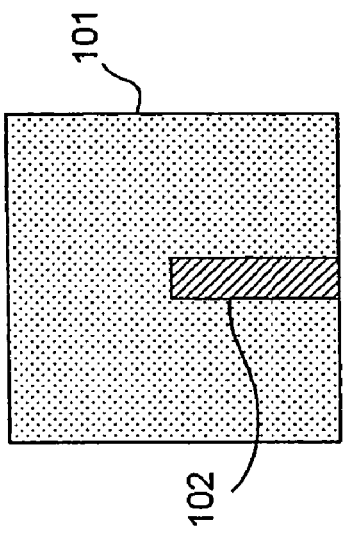
Figure 11D:
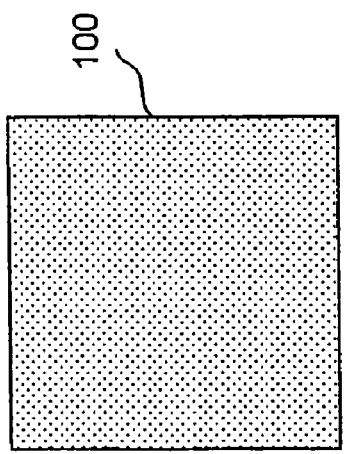
Figure 11C:
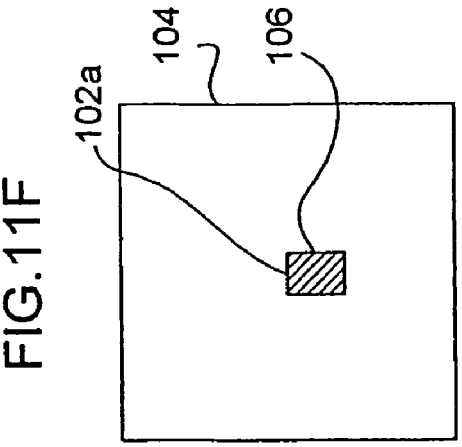
Figure 11E:
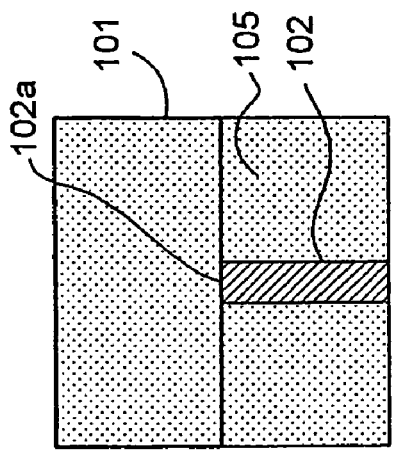
Figure 11F:
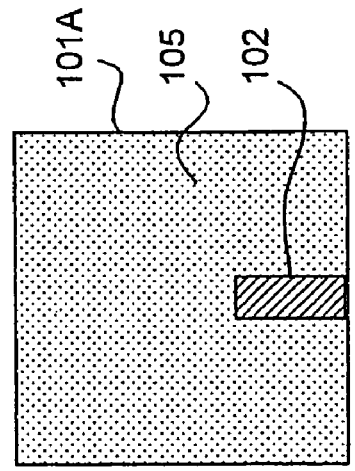

In cue detection processing, first, a two-dimensional image scanned by one image sensor 37 is acquired (step S1). Next, a difference between the acquired image and an image of the same sensor 37, the image being acquired during previous processing, is acquired (step S2). For example, if an image 101A of FIG. 11D is obtained as a previous image, and an image 101 of FIG. 11E is obtained as a current image, an image 104 on a difference as shown in FIG. 11F is acquired. The images 101A and 101 of FIG. 11D and FIG. 11E include a background 105 and a cue image 102. In the differential image 104, an image 106 corresponding to the range in which the tip end of the cue has moved between the previous processing and the current processing is acquired.

Then, the processing goes to the step S3 of FIG. 9 in which a position of a tip end 102a (refer to FIG. 11E and FIG. 11F) of a cue image 102 in the currently scanned image 101 is specified based on the differential image 104. Then, the base image 100 is updated relevant to a range (enclosed in thick line frame in FIG. 11E) which is more distant than the tip end (a point on the center line of the cue) 102a of the cue image 102 (step S4). Namely, of the base image 100, the range which is more distant than the tip end 102a of the cue is replaced with the currently acquired image 101.

The base image 100 is thus replaced because the cue recognition capability is improved by maximally eliminating an effect which a brightness change in the cue detection range 41 imparts to gradation of an image acquired by the image sensor 37. In addition, only a portion which is more distant than the tip end of the cue is updated because any other portion includes the cue image 102, and thus, cannot be used as the base image 100.

After updating the base image 100, the cue image 102 is detected from a difference between the current image 101 and the base image 100 (step S5). Then, a predetermined position of the detected cue, i.e., a coordinate of a tip end 102a and a rear end 102b of the cue image 102 is acquired (step S6). The coordinate acquired here is a coordinate in a two-dimensional coordinate system set on the plane of each image 101.

In the next step S7, it is discriminated whether or not images obtained from two image sensors 37 have been processed. If it is negatively discriminated, an image of the other image sensor 37 is acquired (step S8). Then, the processing returns to the step S2. When it is affirmatively discriminated in the step S7, the processing goes to the step S11 of the FIG. 10.

In the step S11 of FIG. 10, a two-dimensional coordinate of the tip end 102 of the cue acquired in the step S6 is selected as a processing target. The two-dimensional coordinates exist one by one relevant to each image sensor 37. By the processing of the subsequent steps S12 to S16, a three-dimensional coordinate of typical points of the cue is computed based on a two-dimensional coordinate to be processed. Hereinafter, the processing of the steps S12 to S16 will be described with reference to FIG. 12A and FIG. 12B.

Figure 12A:
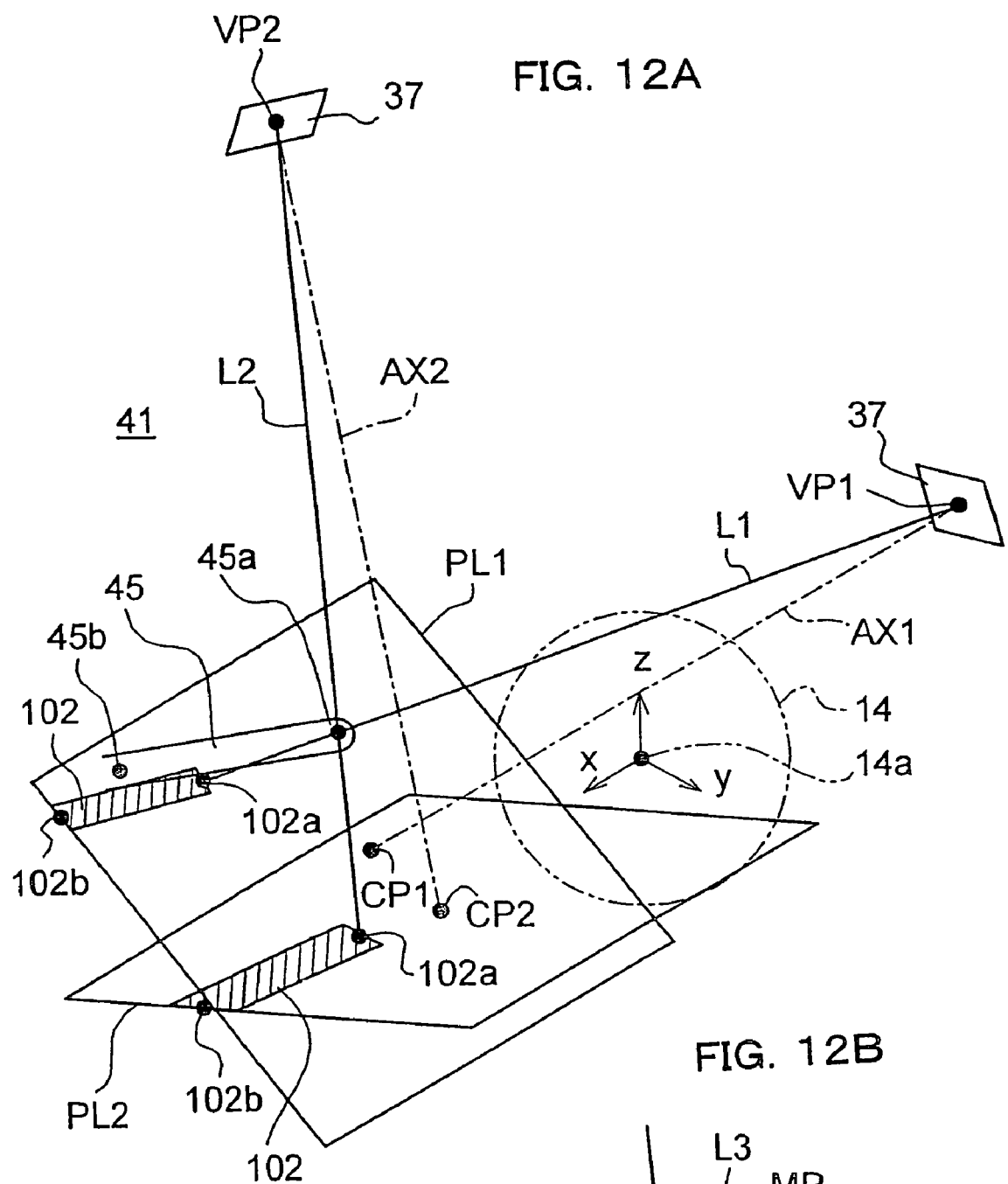
FIG. 12A and FIG. 12B are views illustrating computing procedures executed by the processing of FIG. 10.

FIG. 12A shows a state in which a cue 45 is shot toward the simulative ball 14, wherein a three-dimensional coordinate system x-y-z is set with respect to the detection range 41. For example, when a center 14a of the simulative ball 14 is defined as an origin, x-axis, y-axis, and z-axis are set in the forward/backward direction, transverse direction, and vertical direction of the game machine 1, respectively. The viewpoints VP1 and VP2 of each image sensor 37 are constant, and the three-dimensional coordinates (x1, y1, z1) and (x2, y2, z2) of these viewpoints VP1 and VP2 are already known. In addition, the focal distance of each image sensor 37 is also constant. Further, the image 101 shown in FIG. 11B corresponds to, in FIG. 12A, a projected image onto scanning planes PL1 and PL2 of a predetermined size, the planes being distant from the viewpoints VP1 and VP2 of each image sensor 37 by a focal distance and being orthogonal to optical axes AX1 and AX2 of each image sensor 37. In other words, each image sensor 37 scans an image obtained by projecting the cue 45 onto the scanning plane PL1 and PL2 corresponding to itself, and outputs data on the scanned image.

The three-dimensional coordinate of cross points CP1 and CP2 between the optical axes AX1, AX2 and the scanning plane PL1, PL2 can be obtained from the three-dimensional coordinate of the viewpoints VP1 and VP2 and the focal distance of each image sensor 37. Therefore, a relationship between the two-dimensional coordinate and the three-dimensional coordinate on the scanning planes PL1 and PL2 of the cross points CP1 and CP2 can also be obtained in advance. Based on the relationship between the two-dimensional coordinate and the three-dimensional coordinate on the scanning planes PL1 and PL2 of the cross points CP1 and CP2, the two-dimensional coordinate of all points on the image 101 of FIG. 11B can be converted into the three-dimensional coordinate in the three-dimensional coordinate system of FIG. 12A.

Figure 12B:
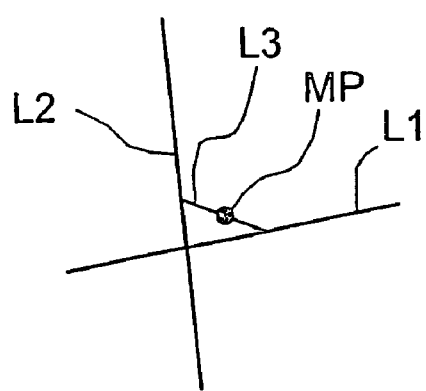

In the processing of FIG. 10, in the case where the two-dimensional coordinate of the tip end 102a of the cue image 102 has been selected in the step S11, the two-dimensional coordinate of the tip end 102a thereof is first converted into the three-dimensional coordinate. Then, an equation expressing straight lines L1 and L2 connecting the tip end 102a and the viewpoints VP1 and VP2 each is obtained (step S12). Next, it is judged whether or not the straight lines L1 and L2 have a cross point (step 313). When it is affirmatively judged, the three-dimensional coordinate of the cross point is determined as a three-dimensional coordinate of the tip end 45a of the cue 45 (step S14). On the other hand, if it is negatively judged, a perpendicular line L3 common to two straight lines L1 and L2 is obtained as shown in FIG. 12B (step S15). Then, the three-dimensional coordinate of a middle point MP of the perpendicular line L3 is determined as a three-dimensional coordinate of the tip end 45a of the cue 45 (step S16). After the three-dimensional coordinate of the tip end 45a has been determined, the processing goes to the step S17 of FIG. 10 in which it is judged whether or not the coordinate of the rear end 102b of the cue image 102 is selected as a processing target. In the case where it is negatively judged, the coordinate of the rear end 102b of the cue image 102 is selected as a processing target (step S18). Then, the processing returns to the step S12 in which the three-dimensional coordinate of the rear end 45b of the cue 45 corresponding to a rear end 102b is obtained. In the case where it is affirmatively judged in the step S17, the cue detection processing is terminated. As has been described above, the three-dimensional coordinate of the tip end 45a and rear end 45b of the cue 45 is obtained, whereby one cue detection processing terminates. The computed three-dimensional coordinate is stored in a predetermined position of a work RAM 53 as information indicating a position of the latest cue and its direction. In addition, the image 101 and base image 100 acquired by the above processing as well are properly stored in the work RAM 53.

Figure 13:
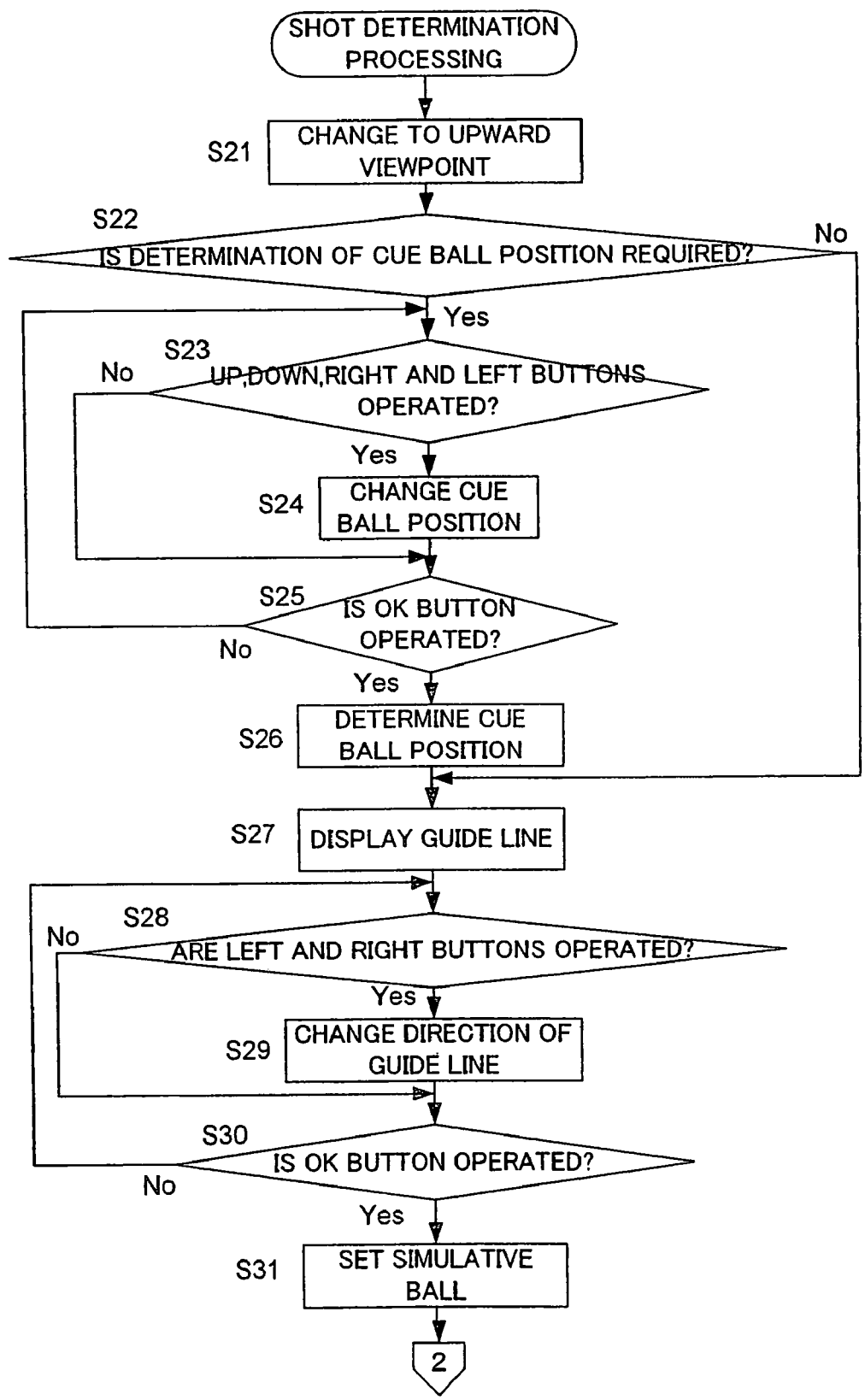
FIG. 13 is a flow chart showing procedures for shot determination processing executed by the CPU of FIG. 8.
Figure 14:
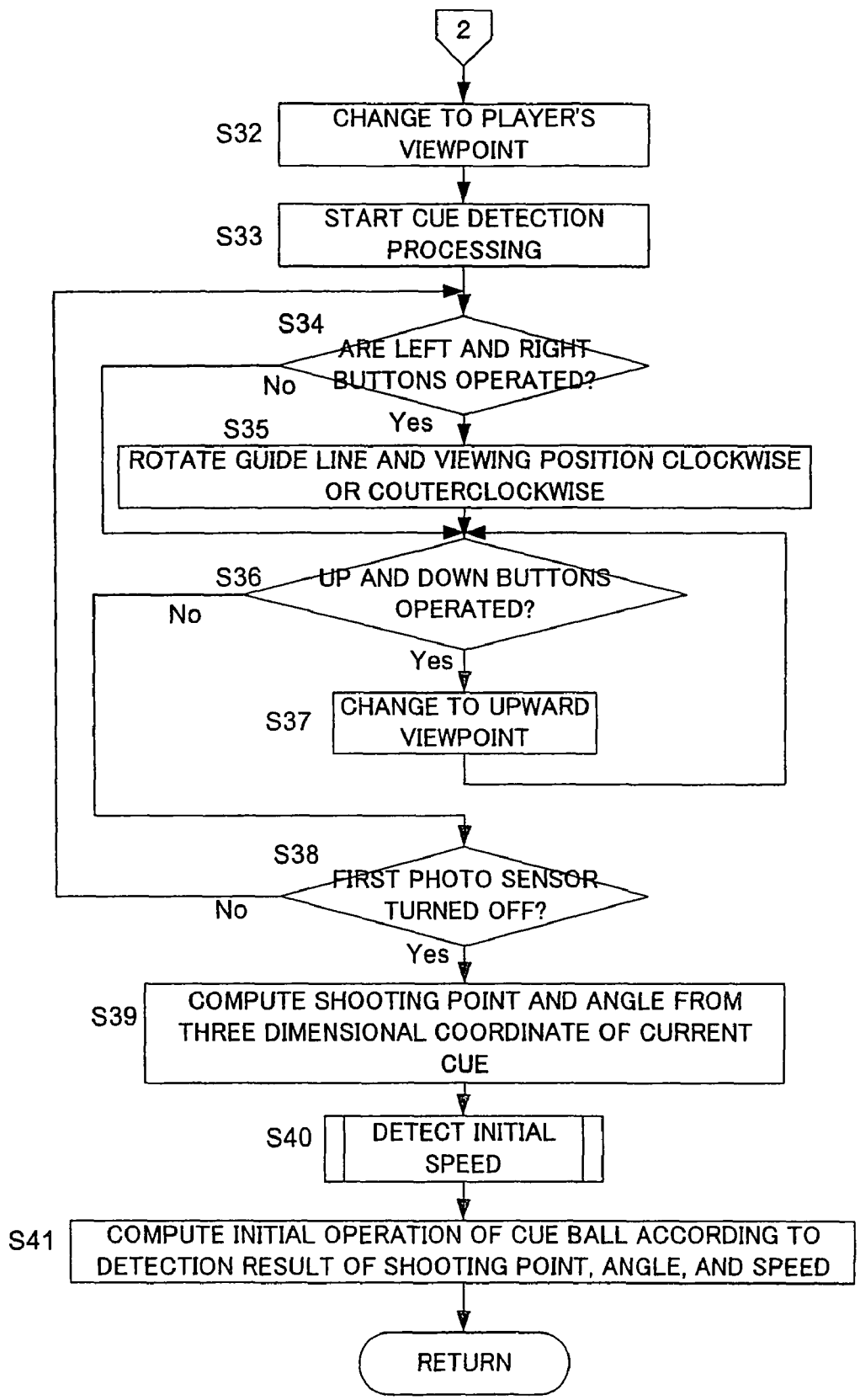
FIG. 14 is a flow chart following that of FIG. 13.

FIG. 13 and FIG. 14 are flow charts showing procedures for shot determination processing executed on a scene on which a player shoots the simulative ball 14, of a variety of processing functions executed by the CPU 50 based on a game program. This processing includes processing for the player to generally determine a virtual cur ball position or shot direction by utilizing operating buttons 9a to 9e (steps S21 to S30); and processing for determining the content of the shot in response to an operation for shooting the simulative ball 14 (steps S33 to S40). Hereinafter, a description will be given in order.

Figure 16:
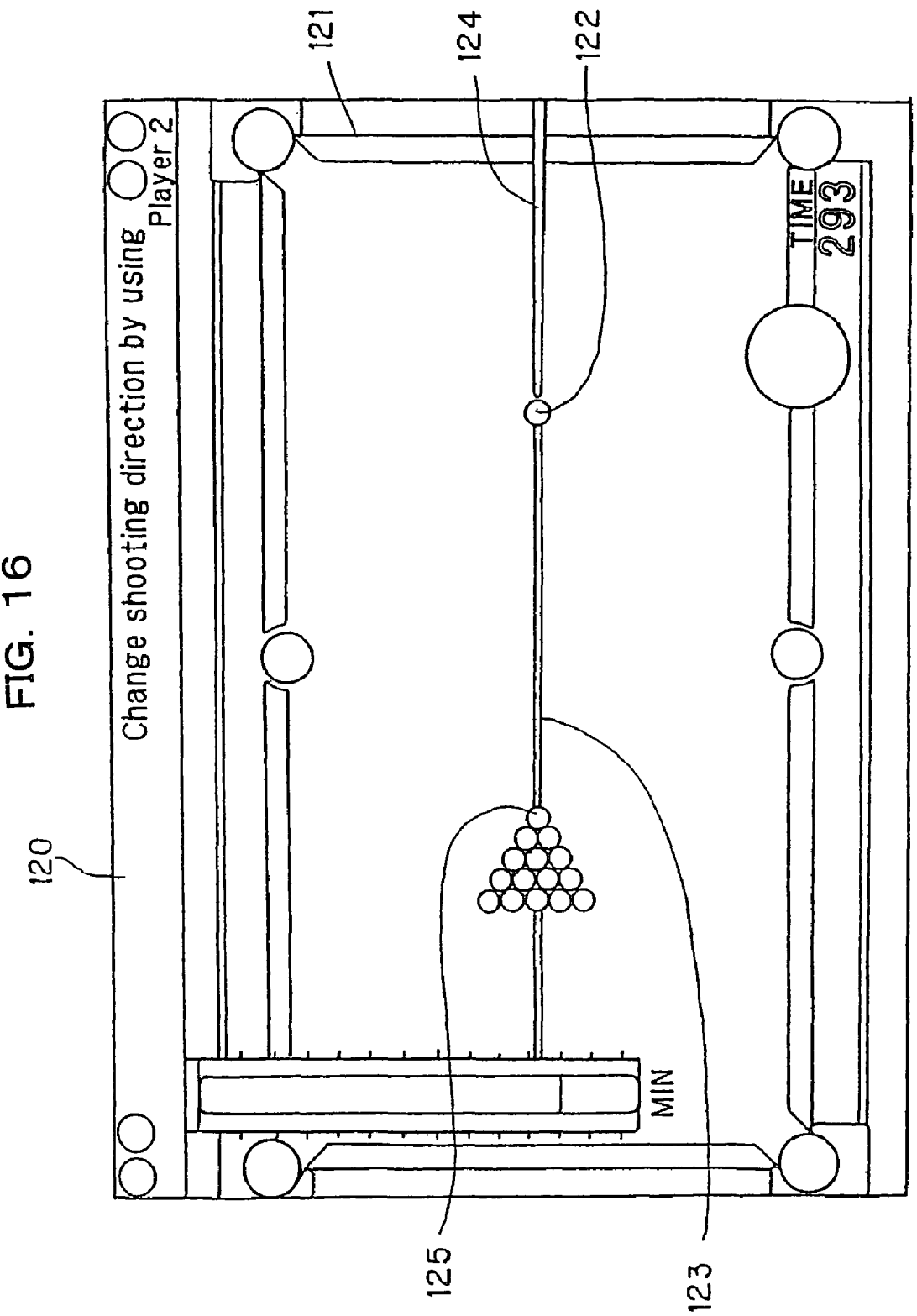
FIG. 16 is a view showing an example of image displayed on a monitor by the processing of FIG. 13.

In shot determination processing, an image obtained when a virtual billiard table is seen from an upward viewpoint is displayed on a monitor 3 (step 521). In this manner, as shown in FIG. 16, for example, an image 120 obtained when a table 121 is seen from the top is displayed on the monitor 3. Then, it is discriminated whether or not there is a need to determine a cue ball position (step S22). For example, in the case of a break shot or in the case where the player's counterpart has made a fault, the player is permitted to place the cue ball at an arbitrary position on the table. Thus, it is affirmatively judged in the step S22. The term "cue ball" used here denotes a virtual cue ball 122 disposed on a virtual billiard table 121 displayed on the monitor 3. While a game is executed, the position of each ball on the table 121 is recorded in the work RAM 53, for example, and is referred to by the CPU 50 as required.

In the case where it is affirmatively judged in the step S22, it is judged whether or not any of the up, down, left, and right operating buttons 9b to 9e is operated to be pushed (step S23). In the case where it is affirmatively judged, the position of the cue ball on the monitor 3 is changed in the direction of the pushed buttons 9b to 9e (step S24). Then, it is judged whether or not an OK button 9a has been operated to be pushed (step S25). In the case where it is negatively judged in the step S22, processing of the step S24 is skipped. When the OK button 9a is not operated, the processing returns to the step S23. Therefore, the player can move the position of the virtual cue ball 122 in the vertical and transverse directions in the screen by utilizing the operating buttons 9b to 9e until the OK button 9a has been operated.

When the player operates the OK button 9a, it is affirmatively judged in the step S25. The CPU 50 recognizes that the player has determined the current position of the cue ball 122 (step S26). The processing of the above steps S23 to S26 determines the cue ball position. In the case where it is negatively judged in the step S22, this processing is skipped.

After the cue ball position has been determined in the step S26, or alternatively, after it has been negatively judged in the step S22, a guide line 123 indicating a trajectory of the cue ball 122 displayed on the monitor 3 is displayed on the monitor 3 (step S27). The guide line 123 is a line indicating movement of the cue ball 122 when the cue ball 122 is shot straight toward a target ball 125 by the virtual cue 124. FIG. 16 shows a display example of the guide line 123 during a break shot.

In the next step S28, it is judged whether or not the left button 9d or right button 9e has been operated. In the case where either of the buttons 9d and 9e has been operated, the direction of the guide line 123 is changed according to the direction of such a button (step S29). By this processing, the player can narrow a target ball. When neither of the operating buttons 9d and 9e is operated, the step S29 is skipped. In the next step S30, it is judged whether or not the OK button 9a has been operated. When it is judged that the button has not been operated, the processing returns to the step S28. When it is judged that the OK button 9a has been operated, the motor 28 is driven so that the simulative ball 14 is set at a shot position (step S31). Then, the processing goes to the step S32 of FIG. 14. The driving of the motor 28 is continued until the photo sensor 31 has been turned ON, and terminates when the photo sensor 31 is turned ON.

Figure 17:
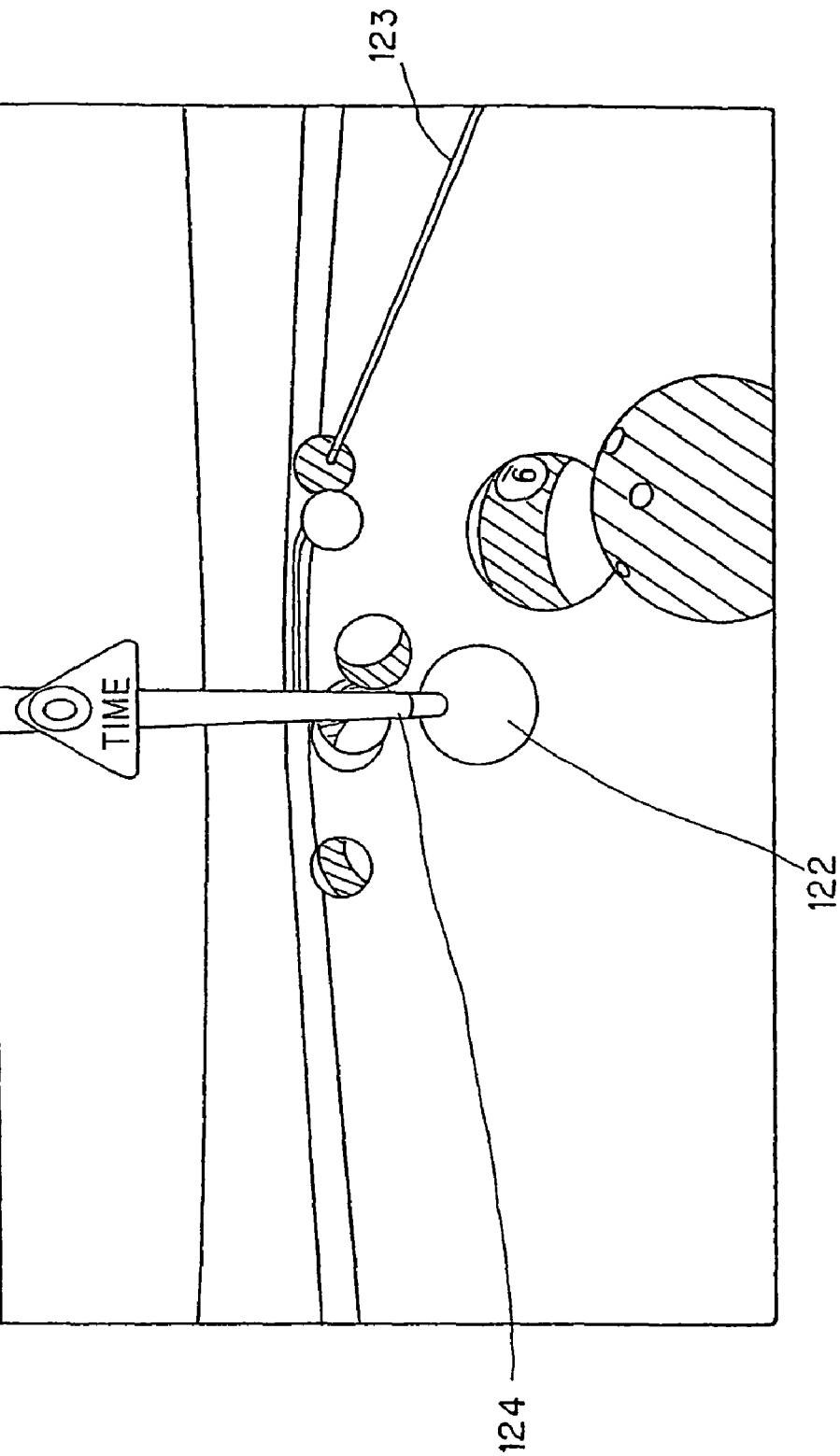
FIG. 17 is a view showing an example of image displayed on a monitor by the processing of FIG. 14.

In the step S32 of FIG. 14, the game screen displayed on the monitor 3 is changed to an image 130 from the player's viewpoint as shown in FIG. 17. This image 130 corresponds to an image obtained when a virtual cue ball 122 is viewed slightly upwardly at the opposite side of a guide line 123. After the image has been changed, the cue detection processing (FIG. 9 and FIG. 10) is started based on the image of the image sensor 37 (step S33). Subsequently, the cue detection processing is repeatedly executed in a predetermined cycle until the processing of FIG. 14 terminates. In the present embodiment, the CPU 50 executes the shot determination processing and the cue detection processing in parallel by time division processing. However, microprocessors that carry out cue detection processing exclusively may be provided independent of the CPU 50.

In the next step S34, it is judged whether or not the left button 9d or right button 9e has been operated. In the case where either of these buttons is operated, the guide line 123 and the viewing position of the image 130 are rotated in the clockwise or counterclockwise direction at the periphery of a virtual cue ball 122 (step S35). When it is negatively judged in the step S34, the step S35 is skipped. In the next step S36, it is judged whether or not the up button 9b or down button 9c has been operated. When either of these buttons has been operated, the image of the monitor 3 is changed to the image 120 (FIG. 16) from an upward viewpoint (step S37), and the processing returns to the step S36. In this manner, while the up button 9b or down button 9c is operated, the image 120 from the upward viewpoint is displayed on the monitor 3. In this manner, the player can check the guide line 123 or the position of each ball again. When operation of the up button 9b or down button 9c is released, the processing goes to the step S38, and it is judged whether or not a first photo sensor 31 has been turned OFF. If the sensor is not turned OFF, the processing returns to the step S34. After the cue detection processing has been started in the step S33, while processing of the steps S34 to S38 is repeated, the three-dimensional coordinate of the cue 45 is serially computed. Then, the cue image 124 is displayed on the image 120 or 130 based on the obtained three-dimensional coordinate.

When the player shoots the simulative ball 14 by the cue 45, the simulative ball 14 falls from the shot position to the standby position. Concurrently, an output of the first photo sensor 31 is changed from ON to OFF. In this manner, it is affirmatively judged in the step S38 of FIG. 14.

In this case, the CPU 50 computes the shooting point of the simulative ball 14 and the shot angle thereof from the current three-dimensional coordinate of the cue (step S39). This computation result can be geometrically obtained from an equation of the simulative ball 14 in the three-dimensional coordinate system and the three-dimensional coordinate of the tip end 45a and rear end 45b of the latest cue 45 at a time when it is affirmatively judged in the step S38. The shot angle is obtained as an angle in the three-dimensional coordinate system, and includes both of an angle relevant to the vertical direction and an angle relevant to the horizontal direction. When the coordinate of the cue 45 acquired at a time when a signal of the first photo sensor 31 has changed is actually obtained as a coordinate after the simulative ball 14 has been shot by the cue 45 for a reason such as delay in processing, it is desirable that the shooting point and the like be specified by using the coordinate of the cue 45 at a time which is estimated as being immediately before the simulative ball 14 is shot by the cue 45.

Figure 15:
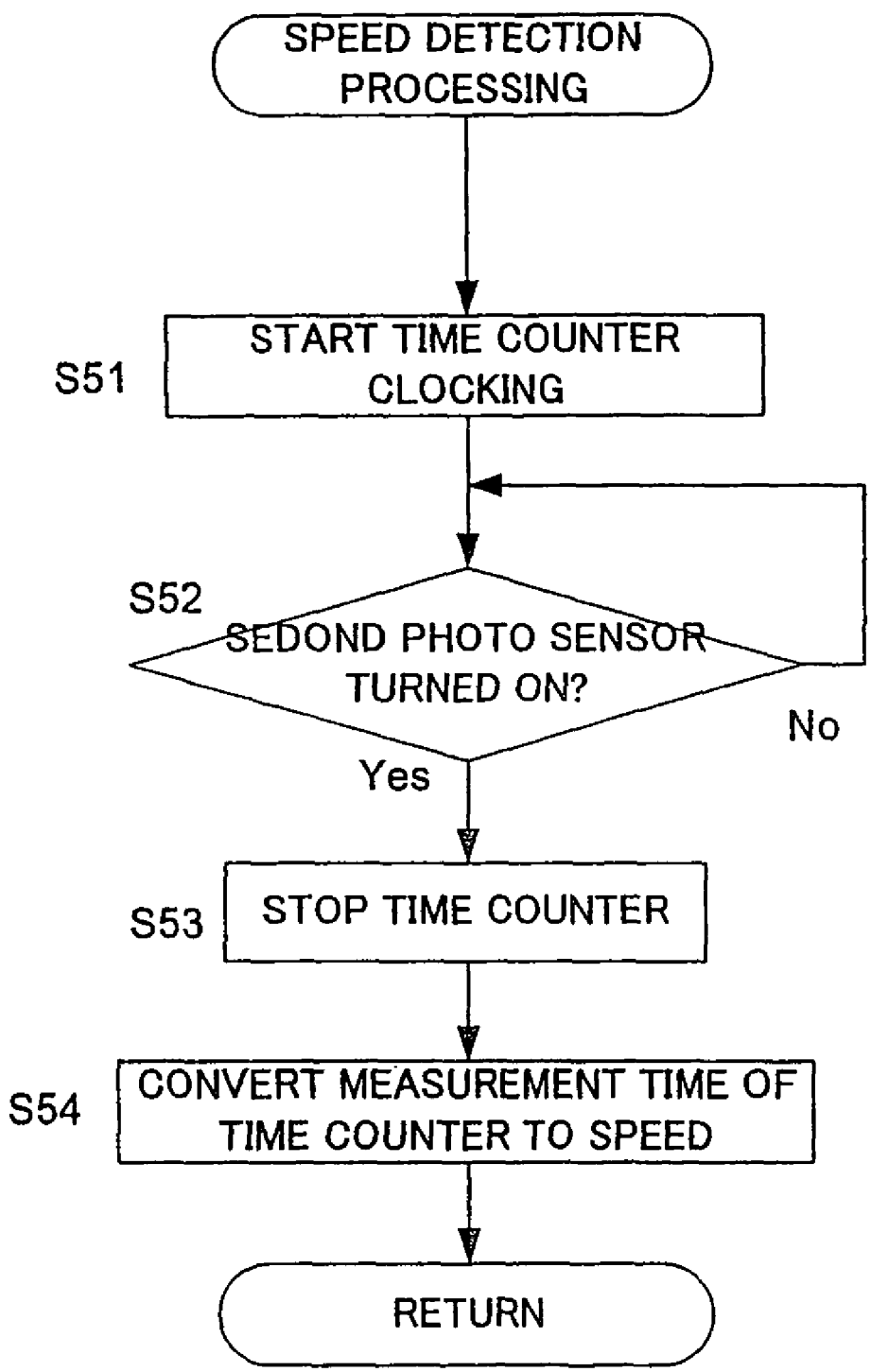
FIG. 15 is a flow chart showing procedures for speed detection processing executed by the CPU as a subroutine process of FIG. 14.

After the shooting point or the like has been computed, subroutine processing for speed detection of the simulative ball 14 is executed by utilizing the first and second photo sensors 31 and 32 (step S40). This subroutine processing is executed in accordance with the procedures shown in FIG. 15. First, the clocking of a time counter is started when the first photo sensor 31 has been turned OFF (step S51). The time counter is provided as software. Then, it is judged whether or not the second photo sensor 32 has been turned ON (step S52). When it is judged that the sensor has been turned ON, the time counter is stopped (step S53). Next, the clocking time of the time counter is converted to an initial speed of the simulative ball 14 (step S54). That is, the clocking time of the time counter is divided by a distance when the simulative ball 14 moves from a time when the first photo sensor 31 has been turned OFF to a time when the second photo sensor 32 has been turned ON, thereby obtaining the initial speed of the simulative ball 14. In this manner, the subroutine processing is terminated, and the processing goes to the step S41 of FIG. 14.

In the step S41, initial operation on the table 121 of the virtual cue ball 122 is computed based on the detection result of the shooting point, shot angle, and initial speed of the simulative ball 14. This computation specifies how the cue ball 122 starts operation on the virtual table 121 in the case where a given shooting point, shot angle, and initial speed are applied to the virtual cue ball 122. Then, shot determination processing is terminated by computation of this initial operation. Subsequently, movements of the cue ball 122 are serially computed with consideration for a roll resistance of the cue ball 122 or collision with another ball, and the cue ball 122 or another ball on the monitor 3 is moved according to the computation result. These computation processing functions may be similar to those of a general video game. A detailed description is omitted here.

The present invention can be carried out according to a variety of aspects without being limited to the above described embodiments. For example, the following variations can occur.

(1) Either one of rotational motion of the simulative ball 14 around the axle of the ball axis 26 and linear motion in the axial direction of the ball axis 26 may be omitted. Instead of a structure for fixing the ball axle 26 and simulative ball 14, both of the all axis 26 and the simulative ball 14 may be linked with each other with a structure such that either of their rotational motion and their linear motion is permitted.

(2) In order to detect operation of the simulative ball, a variety of sensors may be used without being limited to a method utilizing the photo sensors 31 and 32. For example, an acceleration sensor is provided in the inside of the simulative ball 14 or at a movable portion of the support mechanism 16, whereby it may be judged whether or not the simulative ball 14 has been shot based on the output signal or the speed (or acceleration) at which the simulative ball 14 has been shot may be detected.

(3) In the above described embodiments, judgment of whether or not the simulative ball has been shot, computation of a speed at which the simulative ball has been shot, and computation of virtual cue ball operation are executed by the same CPU 50, whereby the CPU 50 of the game machine 1 has also functioned as a discriminating device and a speed computing device of the input device. However, a CPU functioning as a discriminating device or a speed computing device and a CPU carrying out a variety of game computations such as computation of cue ball operation may be provided independently.

(4) The simulative ball 14 may be linearly movable.

(5) The input device according to the present invention may be configured as an input device of a game machine for home use, or alternatively, as an input device of a game system utilizing a network without being limited to an example wherein the input device is configured as an input device of an arcade game machine.

(6) Three or more image acquiring devices such as the image sensors 37 and the like may be provided without being limited to two.

(7) In order to specify the speed of the simulative ball, a variety of sensors may be used without being limited to a method utilizing the photo sensors 31 and 32. For example, an acceleration sensor is provided in the inside of the simulative ball 14 or at a movable portion of the support mechanism 16, whereby it may be judged whether or not the simulative ball 14 has been shot based on the output signal or the speed (or acceleration) at which the simulative ball 14 has been shot may be detected. By an image acquired from the image sensor 37, the three-dimensional coordinate of a typical point (for example, a tip end 45*a*) of the cue 45 is specified over at least two frames. The movement speed of the cue 45 may be computed from these specification results. Alternatively, from the computation result, the speed at which the simulative ball 14 has been shot may be obtained.

(8) In the above described embodiment, the tip end 45*a* and rear end 45*b* of the cue 45 is specified from the image acquired at a time when the simulative ball 14 has been shot, whereby the shooting point of the simulative ball 14 or the shot angle thereof has been computed. However, a time based change at the position of the tip end 45*a*, for example, of the cue 45 is specified from different images in time, whereby the shooting point of the simulative ball 14 or the shot angle thereof can be computed.

(9) In the above embodiment, computation of the position, angle, and speed at which the simulative ball has been shot and computation of virtual cue ball operation based on these computation results are executed by the same CPU 50, whereby the CPU 50 of the game machine 1 has functioned as a coordinate specifying device, an information generating device, a discriminating device, and a base image updating device of the input device. However, a CPU for specifying the shooting point, shot angle and speed of the simulative ball 14 and a CPU for carrying out a variety of game computations such as computation of cue ball operation may be provided independently. That is, the input device 10 according to the present invention may be provided to be commercially available in an aspect of computing and outputting at least one of the position, angle and speed of the shooting.

(10) The simulative ball 14 may be linearly movable.

(11) The game system according to the present invention may be configured as a game machine for home use, or alternatively, a game system utilizing a network without being limited to an example wherein the game system is configured as an arcade game machine. The input device according to the present invention as well may be configured as an input device of a game machine for home use, or alternatively, as an input device of a game system utilizing a network without being limited to an example wherein the input device is configured as an input device for an arcade game machine.

As has been describe above, according to the input device of the present invention, in the case where the simulative ball has been shot in a specific direction off its core, the simulative ball rotates around a ball axis according to the shooting point or shot angle of the simulative ball, or alternatively, the simulative ball can move in the axial direction of the ball axis. At least either one of these motions is permitted, whereby the feeling such that the simulative ball escapes is provided to a player, and the feeling when an actual cue ball has been shot in a variety of directions can be sufficiently reproduced.

According to the billiard game system of the present invention, the three-dimensional coordinate of at least two typical points of the cue is obtained based on the image acquired by an image acquiring device. This makes it possible to specify at which position and from which direction the cue comes into contact with the simulative ball. In this manner, there is no need to constrain the cue for the purpose of detection of the shooting point or shot angle. In addition, there is no need to enable the simulative ball to be partially displaced or to provide a pressure sensing sensor such as a pressure film on its surface in order to specify the shooting point or shot angle. In this manner, a construction of the simulative ball is simplified, and the simulative ball can be simulated to a cue ball used in an actual billiard. Therefore, the simulative ball simulated to the actual cue ball can be freely shot by the cue. Thus, the reality of game is improved, and the amusement of the game increases. The construction of the simulative ball is simplified, and there is no need to provide a mechanism for constraining the cue. The possibility that a problem occurs is lowered concurrently, and system durability and reliability can be improved. In addition, according to the game input device and computer program of the present invention, the above described billiard game system can be easily configured.

What is claimed is:

1. A billiard game system, comprising:
    a simulative ball movably provided in a predetermined direction from a predetermined shot position as an object to be shot by a player;
    a plurality of image acquiring devices for outputting data on images of a predetermined detection range set in a direction in which the player shoots, which are scanned from viewpoints different from each other relevant to the simulative ball at the shot position;
    a coordinate computing device for computing, in a predetermined time period, a three-dimensional coordinate of at least two typical points of a cue in a three-dimensional coordinate system set with respect to the detection range based on data outputted from each image acquiring device;
    a position/angle specifying device for specifying a shooting point and a shot angle of the simulative ball based on the coordinate of the typical points of the cue computed by the coordinate computing device;
    a speed information detecting device for detecting information correlated with a speed of the simulative ball, wherein the speed information detecting device comprises sensors;
    a speed specifying device for specifying a speed at which the simulative ball has been shot based on information detected by the speed information detecting device;
    a link portion having a ball axis on which the simulative ball is capable of being mounted;
    a support portion for movably supporting the link portion;
    a predetermined chassis,
    wherein a table portion simulating a part of a table of a billiard base is provided at the chassis; an upper face of the table portion functions as a table face; a space opening forwardly of the table portion is formed by the table face and a hood covering the face; a simulative ball of the shot position is movable between the shot position and a standby position retracted to the depth of the space further than the shot position; and a respective one of the plurality of image acquiring devices is disposed in the hood or under the hood in a state in which a scanning direction is oriented more downwardly than a horizontal direction; and
    a computing device for computing an operation of a virtual cue ball to be displayed on a screen of a predetermined display unit in correspondence with the simulative ball based on the specified shooting point, angle, and speed,
    wherein
    a respective one of the plurality of image acquiring devices outputs data that corresponds to a projected image onto each scanning plane different from each other, the scanning planes being set in the three-dimensional coordinate system, and
    the coordinate computing device comprises:
        a two-dimensional coordinate acquiring device for acquiring a two-dimensional coordinate of points that correspond to the typical points of a cue image included in the image scanned by each image acquiring device;
        a straight line specifying device for converting the two-dimensional coordinate of each point acquired by the two-dimensional coordinate acquiring device into the three-dimensional coordinate system based on information for making a three-dimensional coordinate relate to a two-dimensional coordinate on the scanning plane with respect to an intersection point of the scanning plane and an optical axis corresponding to each of the image acquiring devices, the scanning plane being placed in a predetermined distance from a viewpoint of each of the image acquiring devices, the three-dimensional coordinate determined by a position of the viewpoint and the predetermined distance, and then, specifying straight lines that connect each point at which the three-dimensional coordinate has been assigned and each viewpoint corresponding to each of the scanning planes to which each of the points belongs; and
        a typical point coordinate-determining device for determining a three-dimensional coordinate of each of the typical points on the cue from a mutual relationship between the specified straight lines.

2. The billiard game system according to claim 1, comprising:
    a simulative ball operation detecting device for detecting the presence or absence of an operation from the shot position of the simulative ball; and
    a discriminating device for discriminating whether or not the simulative ball has been shot, based on a detection result of the simulative ball operation detecting device,
    wherein the position/angle specifying device specifies the shooting point and the angle based on the coordinate of the cue at a time when it is discriminated that the simulative ball has been shot.

3. The billiard game system according to claim 2,
    wherein the simulative ball operation detecting device comprises a sensor whose output changes depending on whether or not the simulative ball exists at the shot position.

4. The billiard game system according to claim 1,
    wherein the typical point coordinate determining device determines a three-dimensional coordinate of a cross point of at least two straight lines, or alternatively, of a middle point of a perpendicular line common to at least two straight lines as the three dimensional coordinate of each of the typical points.

5. The billiard game system according to claim 1,
    wherein the two-dimensional coordinate acquiring device extracts the cue image from a difference between a base image corresponding to a background image when the cue is excluded from the detection range and an image including the cue, and acquires a two-dimensional coordinate of at least each two points of the extracted image.

6. The billiard game system according to claim 5,
    wherein a respective one of the plurality of image acquiring devices scans repeatedly the detection range and outputs each of the scanned image data, and
    wherein the two-dimensional coordinate acquiring device comprises a base image updating device for specifying at least a part of a range of the background in a latest image based on a difference between the latest image and a past image, and then, replacing the base image relevant to the specified range with a content of the latest image.

7. The billiard game system according to claim 1,
    wherein the position/angle specifying device specifies a shot angle relevant to a vertical direction and a shot angle relevant to a horizontal direction, respectively.

8. The billiard game system according to claim 1,
    wherein the sensors of the speed information detecting device changes outputs according to the presence or absence of the simulative ball at a respective one of two detection positions spaced from each other with respect to the predetermined direction or a member that moves together with the simulative ball, wherein the speed specifying device detects a time interval from a time when an output signal of one of the sensors changes accompanied with movement of the simulative ball to a time when an output signal of another of the sensors changes, and computes a speed at which the simulative ball has been shot based on the detection result, and wherein the sensors of the speed information detecting device are provided so that their outputs change depending on whether or not the link portion exists at a respective one of the two detection positions set in a movement range of the link portion.

9. A game input device comprising:

a simulative ball movably provided in a predetermined direction from a predetermined shot position as an object to be shot by a player;

a plurality of image acquiring devices for outputting data on images of a predetermined detection range set in a direction in which the player shoots, which are scanned from viewpoints different from each other relevant to the simulative ball at the shot position;

a coordinate computing device for computing, in a predetermined time period, a three-dimensional coordinate of at least each two typical points, of a rod shaped member in a three-dimensional coordinate system set with respect to the detection range based on the data outputted from each of the image acquiring devices;

a link portion having a ball axis on which the simulative ball is capable of being mounted;

a support portion for movably supporting the link portion;

a predetermined chassis, wherein a table portion simulating a part of a table of a billiard base is provided at the chassis; an upper face of the table portion functions as a table face; a space opening forwardly of the table portion is formed by the table face and a hood covering the face; a simulative ball of the shot position is movable between the shot position and a standby position retracted to the depth of the space further than the shot position; and a respective one of the plurality of image acquiring devices is disposed in the hood or under the hood in a state in which a scanning direction is oriented more downwardly than a horizontal direction; and an information generating device for generating information correlated with at least one of a shooting point of the simulative ball, a shot angle of the simulative ball or a speed at which the simulative ball has been shot, based on a coordinate of the typical points of the rod shaped member computed by the coordinate computing device, wherein a respective one of the plurality of image acquiring devices outputs data that corresponds to a projected image onto each scanning plane different from each other, the scanning planes being set in the three-dimensional coordinate system, and the coordinate computing device comprises:

a two-dimensional coordinate acquiring device for acquiring a two-dimensional coordinate of points that correspond to the typical points of the rod shaped member image included in the image scanned by each image acquiring device;

a straight line specifying device for converting the two-dimensional coordinate of each point acquired by the two-dimensional coordinate acquiring device into the three-dimensional coordinate system based on information for making a three-dimensional coordinate relate to a two-dimensional coordinate on the scanning plane with respect to an intersection point of the scanning plane and an optical axis corresponding to each of the image acquiring devices, the scanning plane being placed in a predetermined distance from a viewpoint of each of the image acquiring devices, the three-dimensional coordinate determined by a position of the viewpoint and the predetermined distance, and then, specifying straight lines that connect each point at which the three-dimensional coordinate has been assigned and each viewpoint corresponding to each of the scanning planes to which each of the points belongs; and a typical point coordinate-determining device for determining a three-dimensional coordinate of each of the typical points on the rod shaped member from a mutual relationship between the specified straight lines.

10. The game input device according to claim 9, further comprising:

a speed information detecting device for detecting information correlated with a speed of the simulative ball; and a speed specifying device for specifying a speed at which the simulative ball has been shot based on the information detected by the speed information detecting device, wherein the information generating device generates information correlated with a shooting point of the simulative ball and a shot angle thereof.

11. The game input device according to claim 9, comprising:

a simulative ball operation detecting device for detecting an operation of the simulative ball from the shot position; and a discriminating device for discriminating whether or not the simulative ball has been shot, based on a detection result of the simulative ball operation detecting device, wherein the information generating device generates the information based on a coordinate of the rod shaped member at a time when it is discriminated that the simulative ball has been shot.

12. The game input device according to claim 11, wherein the simulative ball operation detecting device comprises a sensor whose output changes depending on whether or not the simulative ball exists at a position where the simulative ball is to be shot by the rod shaped member.

13. The game input device according to claim 9, wherein the typical point coordinate determining device determines a three-dimensional coordinate of a cross point of at least two straight lines, or alternatively, a middle point of a perpendicular line common to at least two straight lines, as a three-dimensional coordinate of the typical points.

14. The game input device according to claim 9, wherein the two-dimensional point coordinate acquiring device extracts an image of the rod shaped member from a difference between a base image that corresponds to a background image when the rod shaped member is excluded from the detection range and an image including the rod shaped member, and acquires a two-dimensional coordinate of at least each two points of the extracted image.

15. A game input device as claimed in claim 14, wherein a respective one of the plurality of image acquiring devices outputs data on an image obtained by repeatedly scanning the detection range; and wherein the two-dimensional coordinate acquiring device comprises a base image updating device for specifying at least a part of a range of the background in a latest image based on a difference between the latest image and a past image, and then, replacing the base image relevant to the specified range with a content of the latest image.

16. The game input device according to claim 9,
wherein the information generating device generates information required to specify a shot angle relevant to a vertical direction and a shot angle relevant to a horizontal direction, respectively.

17. The game input device according to claim 10,
wherein the speed information detecting device comprises sensors whose output changes according to the presence or absence of the simulative ball at a respective one of two detection positions spaced from each other relevant to the predetermined direction or a member that moves together with the simulative ball, and
wherein the information generating device detects a time interval from a time when an output signal of one of the sensors changes accompanied with movement of the simulative ball to a time when an output signal of another one of the sensors changes, and then, computes a speed at which the simulative ball has been shot based on the detection result,
wherein the sensors of the speed information detecting device are provided so that their outputs change depending on whether or not the link portion exists at a respective one of the two detection positions set in a movement range of the link portion.

18. The game input device according to claim 9,
wherein the game input device is configured as an input device for a billiard game.

19. A non-transitory computer readable storage medium including an executable computer program for, based on data on an image outputted from a respective one of a plurality of image acquiring devices for scanning a predetermined detection range from viewpoints different from each other, recognizing a rod shaped member poked in the detection range;
the computer program programmed to simulate a billiard game for an arcade game machine, the arcade game machine comprising:
a link portion having a ball axis on which a simulative ball is capable of being mounted;
a support portion for movably supporting the link portion;
a predetermined chassis,
wherein a table portion simulating a part of a table of a billiard base is provided at the chassis; an upper face of the table portion functions as a table face; a space opening forwardly of the table portion is formed by the table face and a hood covering the face; a simulative ball of a shot position is movable between the shot position and a standby position retracted to the depth of the space further than the shot position; and a respective one of the plurality of image acquiring devices is disposed in the hood or under the hood in a state in which a scanning direction is oriented more downwardly than a horizontal direction;
wherein the computer program causing a computer to function as:
a coordinate computing device for computing, in a predetermined time period, a three-dimensional coordinate of at least two typical points of the rod shaped member in a three-dimensional coordinate system set with respect to the detection range based on data outputted from each image acquiring device; and
an information generating device for generating, based on a coordinate of each of the at least two typical points of the rod shaped member computed by the coordinate computing device, information correlating with at least one of a shooting point of a predetermined target, a shot angle of the target or a speed when the target has been shot, when the predetermined target disposed in the three-dimensional coordinate system is shot by the rod shaped member, wherein a respective one of the plurality of image acquiring devices outputs data that corresponds to a projected image onto each scanning plane different from each other, the scanning planes being set in the three-dimensional coordinate system, and
the coordinate computing device comprises:
a two-dimensional coordinate acquiring device for acquiring a two-dimensional coordinate of points that correspond to the typical points of the rod shaped member image included in the image scanned by each image acquiring device;
a straight line specifying device for converting the two-dimensional coordinate of each point acquired by the two-dimensional coordinate acquiring device into the three-dimensional coordinate system based on information for making a three-dimensional coordinate relate to a two-dimensional coordinate on the scanning plane with respect to an intersection point of the scanning plane and an optical axis corresponding to each of the image acquiring devices, the scanning plane being placed in a predetermined distance from a viewpoint of each of the image acquiring devices, the three-dimensional coordinate determined by a position of the viewpoint and the predetermined distance, and then, specifying straight lines that connect each point at which the three-dimensional coordinate has been assigned and each viewpoint corresponding to each of the scanning planes to which each of the points belongs; and
a typical point coordinate-determining device for determining a three-dimensional coordinate of each of the typical points on the rod shaped member from a mutual relationship between the specified straight lines.

* * * * *